(12) United States Patent
Oka

(10) Patent No.: US 12,487,400 B2
(45) Date of Patent: Dec. 2, 2025

(54) OPTICAL DEVICE, SUBSTRATE TYPE OPTICAL WAVEGUIDE ELEMENT, OPTICAL COMMUNICATION APPARATUS, AND INTER-WAVEGUIDE TRANSITION METHOD

(71) Applicant: Fujitsu Optical Components Limited, Kawasaki (JP)

(72) Inventor: Akira Oka, Kawasaki (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 275 days.

(21) Appl. No.: 18/064,085

(22) Filed: Dec. 9, 2022

(65) Prior Publication Data
US 2023/0244032 A1 Aug. 3, 2023

(30) Foreign Application Priority Data
Jan. 28, 2022 (JP) ................................. 2022-011793

(51) Int. Cl.
*G02B 6/122* (2006.01)
*G02B 6/12* (2006.01)
*G02B 6/125* (2006.01)

(52) U.S. Cl.
CPC ......... *G02B 6/1228* (2013.01); *G02B 6/1223* (2013.01); *G02B 6/125* (2013.01);
(Continued)

(58) Field of Classification Search
CPC ......... G02B 6/1228; G02B 6/305; G02B 6/14
See application file for complete search history.

(56) References Cited

U.S. PATENT DOCUMENTS 7,397,995 B2  7/2008 Blauvelt et al.
10,120,135 B2 * 11/2018 Yang ...................... G02B 6/305
(Continued)

FOREIGN PATENT DOCUMENTS

CN   207281327 U  *  4/2018   ............... G02B 6/14
CN   112882154 A  *  6/2021   ............... G02B 6/12
(Continued)

OTHER PUBLICATIONS

Hu, Machine Translation of CN 11282154 A, 2021-06-01. (Year: 2021).*
(Continued)

*Primary Examiner* — Michelle R Connelly
(74) *Attorney, Agent, or Firm* — STAAS & HALSEY LLP

(57) ABSTRACT

An optical device includes a transition unit in which a first waveguide and a second waveguide are disposed in an overlapped manner such that a magnitude relationship of an effective refractive index between the vertical modes propagating the first waveguide and the vertical modes propagating the second waveguide is inverted at the positions of input and output. The transition unit allows, at the input, the second waveguide to be a single mode waveguide and allows, at the output, the second waveguide to be a multimode waveguide through which TM0 light in the maximum vertical mode and light in a higher-order mode propagate. The optical device includes a removing unit that allows the second waveguide to be a single mode waveguide through which the TM0 light propagates by removing the light in the higher-order mode from the light received from the transition unit.

10 Claims, 14 Drawing Sheets

(52) U.S. Cl.
CPC .............. *G02B 2006/12061* (2013.01); *G02B 2006/12097* (2013.01)

(56) References Cited

U.S. PATENT DOCUMENTS

| | | | |
|---|---|---|---|
| 12,153,251 B2 * | 11/2024 | Tu ........................ | G02B 6/4246 |
| 2010/0040327 A1 | 2/2010 | Deki et al. | |
| 2015/0316720 A1 * | 11/2015 | Yang ..................... | G02B 6/132 385/14 |
| 2016/0131842 A1 * | 5/2016 | Mahgerefteh .......... | G02B 6/136 385/11 |

FOREIGN PATENT DOCUMENTS

| | | | | |
|---|---|---|---|---|
| EP | 3091379 B1 * | 12/2020 | ......... | G02B 6/12002 |
| JP | 2015-191110 A | 11/2015 | | |
| JP | 2016-180865 A | 10/2016 | | |
| WO | WO 2008/114624 A1 | 9/2008 | | |

OTHER PUBLICATIONS

Chen, Machine Translation of CN 207281327 U, 2018-04-27. (Year: 2018).*

* cited by examiner

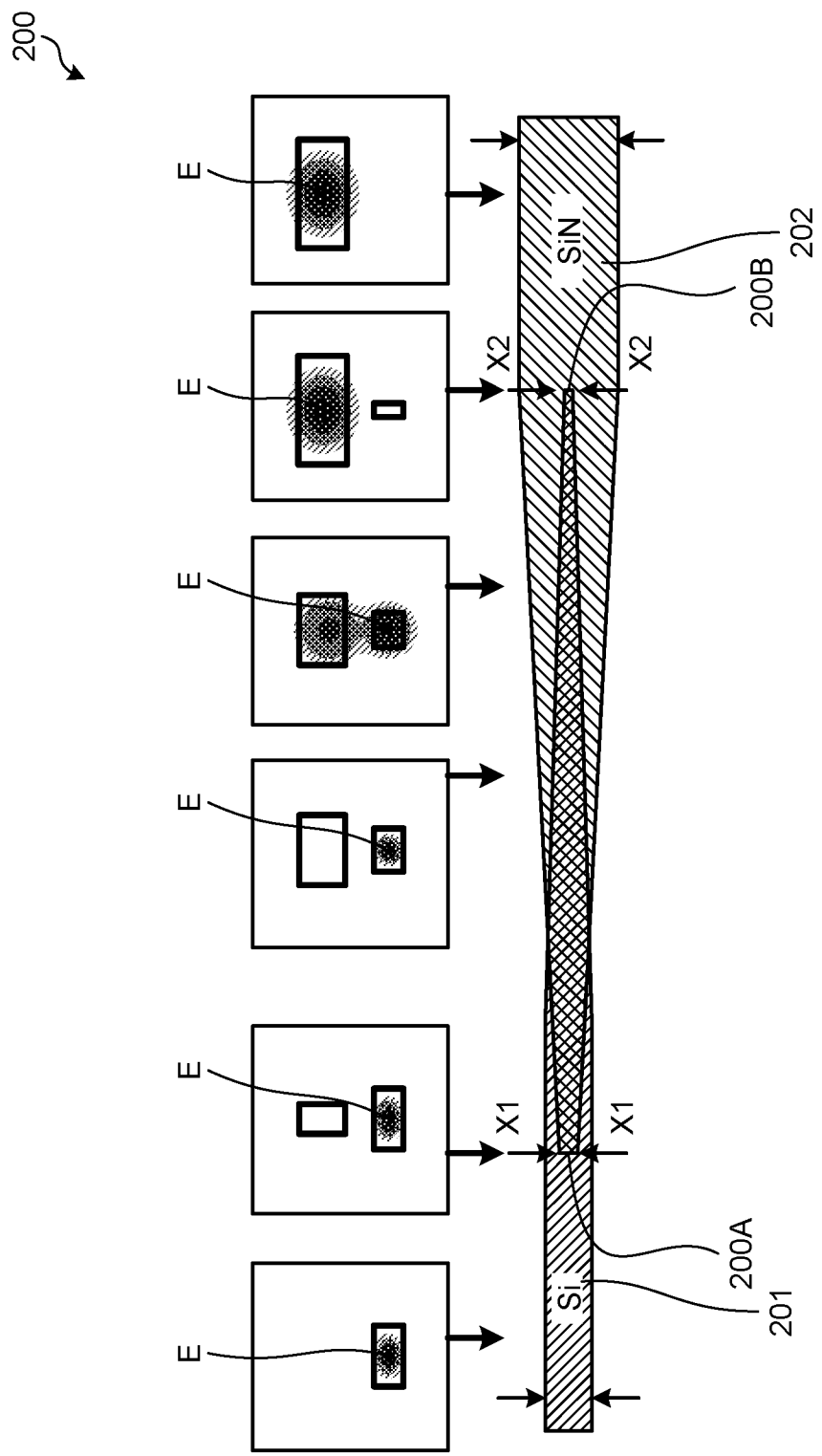

OPTICAL DEVICE, SUBSTRATE TYPE OPTICAL WAVEGUIDE ELEMENT, OPTICAL COMMUNICATION APPARATUS, AND INTER-WAVEGUIDE TRANSITION METHOD

CROSS-REFERENCE TO RELATED APPLICATION

This application is based upon and claims the benefit of priority of the prior Japanese Patent Application No. 2022-011793, filed on Jan. 28, 2022, the entire contents of which are incorporated herein by reference.

FIELD

The embodiment discussed herein is related to an optical device, a substrate type optical waveguide element, an optical communication apparatus, and an inter-waveguide transition method.

BACKGROUND

In recent years, there are increased demands for optical fiber communication in accordance with an increase in communication capacity, so that small-sized optical devices that convert electrical signals to optical signals are used. Accordingly, in recent years, development of an ultra-compact substrate type optical waveguide element (hereinafter, simply referred to as an optical device) represented by silicon photonics is actively studied. In the optical device, two or more waveguides made of different materials can be integrally mounted on a same chip.

The optical components constituting the optical device each have a different characteristic depending on, for example, a material refractive index, so that it is possible to improve the characteristic of the optical device by using a waveguide made of suitable material for each of the optical components. Therefore, the optical device constituted by using waveguides that are made of different materials has an inter-waveguide transition structure in which light propagates by indirect transition between different waveguides.

Furthermore, in the optical device, in order to increase communication capacity, a polarization transmission technology for transmitting different signals by using two quadrature polarization components is used. The two quadrature polarization components include a TE-like mode (hereinafter, simply referred to as a TE mode) in which an electric field component that is parallel to a substrate is the main, and a TM-like mode (hereinafter, simply referred to as a TM mode, or a vertical mode) in which an electric field component that is perpendicular to the substrate is the main.

In the TM mode, confinement of light to the core is weaker than that in the TE mode, so that an optical loss is increased in an indirect transition between the different waveguides. Accordingly, in the inter-waveguide transition structure, there is a need to suppress an optical loss in the TM mode caused by the indirect transition between the different waveguides.

FIG. 9 is a diagram illustrating an example of an inter-waveguide transition structure 200 that is conventionally used. In the inter-waveguide transition structure 200 illustrated in FIG. 9 includes, for example, a waveguide made of Si (hereinafter, simply referred to as a Si waveguide) 201 covered by a $SiO_2$ clad, and, for example, a waveguide made of $Si_3N_4$ (hereinafter, simply referred to as a Silicon Nitride (SiN) waveguide) 202 covered by a clad. In the inter-waveguide transition structure 200, light in a TE0 mode having the maximum effective refractive index out of the TE modes propagates by indirect transition between the Si waveguide 201 and the SiN waveguide 202.

In the inter-waveguide transition structure 200, the SiN waveguide 202 is disposed over the Si waveguide 201 at an intermediate position of the Si waveguide 201, the waveguide width of the Si waveguide 201 is gradually reduced along the traveling direction of light, and, at the same time, the waveguide width of the SiN waveguide 202 is gradually increased. Then, the inter-waveguide transition structure has a structure in which the Si waveguide 201 is finally terminated and only the SiN waveguide 202 remains. Then, in the inter-waveguide transition structure 200, electric fields E that are localized in the Si waveguide 201 at positions between the Si waveguide 201 and the SiN waveguide 202 are gradually and adiabatically transitioned to the SiN waveguide 202.

Patent Document 1: Japanese Laid-open Patent Publication No. 2016-180865
Patent Document 2: Japanese Laid-open Patent Publication No. 2015-191110
Patent Document 3: International Publication Pamphlet No. WO 2008/114624
Patent Document 4: U.S. Pat. No. 7,397,995
Non-Patent Document 1: Wesley D. Sacher, et al., "Monolithically Integrated Multilayer Silicon Nitride-on-Silicon Waveguide Platforms for 3-D Photonic Circuits and Devices," Proceedings of the IEEE, Vol. 106, No. 12, December 2018

However, the conventional inter-waveguide transition structure 200 includes a first cross-sectional portion X1 in which the SiN waveguide 202 having a small waveguide width is discontinuously generated in the upstream of the Si waveguide 201. Furthermore, in the conventional inter-waveguide transition structure 200, a second cross-sectional portion X2 in which the Si waveguide 201 with a narrow waveguide width is gradually fading away is generated in the downstream of the SiN waveguide 202. In other words, the conventional inter-waveguide transition structure 200 includes two discontinuous cross-sectional portions. In the inter-waveguide transition structure 200, transitioning light scatters caused by the discontinuous cross-sectional portions X1 and X2, and an optical loss is produced.

Furthermore, for example, in the case where the wavelength of light is 1.55 μm, the material refractive index of Si is about 3.5, and the material refractive index of $Si_3N_4$ is about 2.0, so that the material refractive index of Si is larger. In general, a core that has a higher material refractive index is able to confine the electric fields in the core. Accordingly, in the second cross-sectional portion X2 in which the Si waveguide 201 that has a narrow waveguide width and that is terminated at a position of the downstream of the SiN waveguide 202, a loss caused by discontinuity is increased at a position as the electric fields E are more localized in the core of the Si waveguide 201 that is terminated. As a result, due to an increase caused by discontinuity, an optical loss affected in the second cross-sectional portion X2 in which the Si waveguide 201 is terminated is noticeable. The optical loss affected in the second cross-sectional portion X2 in which the Si waveguide 201 is terminated is not only generated in a case of the indirect transition between the Si waveguide 201 and the SiN waveguide 202, but also generated in a case of the inter-waveguide transition structure that uses waveguides having a magnitude relationship between the material refractive indices. In addition, an increase in the optical loss caused by light scattering in the discontinuous cross-sectional portion is more noticeable for the light in the TM0 mode than the light in the TE0 mode.

In the conventional inter-waveguide transition structure 200, light in the TM0 mode propagating through the Si waveguide 201 adiabatically transitions to light in the TM0 mode propagating through the SiN waveguide 202. In order for the light in the TM0 mode to transition, the Si waveguide 201 and the SiN waveguide 202 need to be disposed such that the effective refractive index of the TM0 mode propagating through the Si waveguide 201 and the effective refractive index of the TM0 mode propagating through the SiN waveguide 202 gradually match. Then, TM0 mode propagating through the Si waveguide 201 and the TM0 mode propagating through the SiN waveguide 202 are interacted with each other, so that the electric fields in the TM0 mode are distributed in the Si waveguide 201 and the SiN waveguide 202.

In an input portion 200A and an output portion 200B included in the inter-waveguide transition structure 200, it is preferable that a connection with an external isolated waveguide be efficiently set up. Furthermore, the external isolated waveguide mentioned here is, for example, a stand-alone waveguide of the Si waveguide 201 that does not include the SiN waveguide 202 on the Si waveguide 201, or a stand-alone waveguide of the SiN waveguide 202 that does not include the Si waveguide 201 below the SiN waveguide 202.

However, in the input portion 200A and the output portion 200B, an interaction in which the electric fields are distributed in both of the Si waveguide 201 and the SiN waveguide 202 is not preferable. In the input portion 200A and the output portion 200B, if the electric fields are distributed in both of the waveguides, when the input portion 200A and the output portion 200B are connected to the external isolated waveguide, an optical loss, mode conversion, reflection, and the like are consequently produced caused by a mismatch of the mode distribution.

SUMMARY

According to an aspect of an embodiment, an optical device through which light in vertical modes propagates by indirect transition between a first waveguide that has a first material refractive index and a second waveguide that has a second material refractive index that is lower than the first material refractive index, includes a transition unit and a removing unit. The transition unit acts, at an input portion of the transition unit, the second waveguide as a single mode waveguide through which TM0 light in the vertical mode having a maximum effective refractive index propagates. The transition unit acts, at an output portion of the transition unit, the second waveguide as a multi-mode waveguide through which the TM0 light in the vertical mode having the maximum effective refractive index and light in a higher-order mode propagate by disposing the first waveguide and the second waveguide in an overlapped manner with a space between the first waveguide and the second waveguide such that a magnitude relationship between the effective refractive index of the vertical modes propagating through the first waveguide and the effective refractive index of the vertical modes propagating through the second waveguide is inverted at the positions of the input portion and the output portion. The removing unit acts the second waveguide as the single mode waveguide through which the TM0 light having the maximum effective refractive index propagates by removing the light in the higher-order mode from the light in the vertical modes received from the transition unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 9 is a diagram illustrating an example of a conventional inter-waveguide transition structure.

DESCRIPTION OF EMBODIMENT

Figure 6:
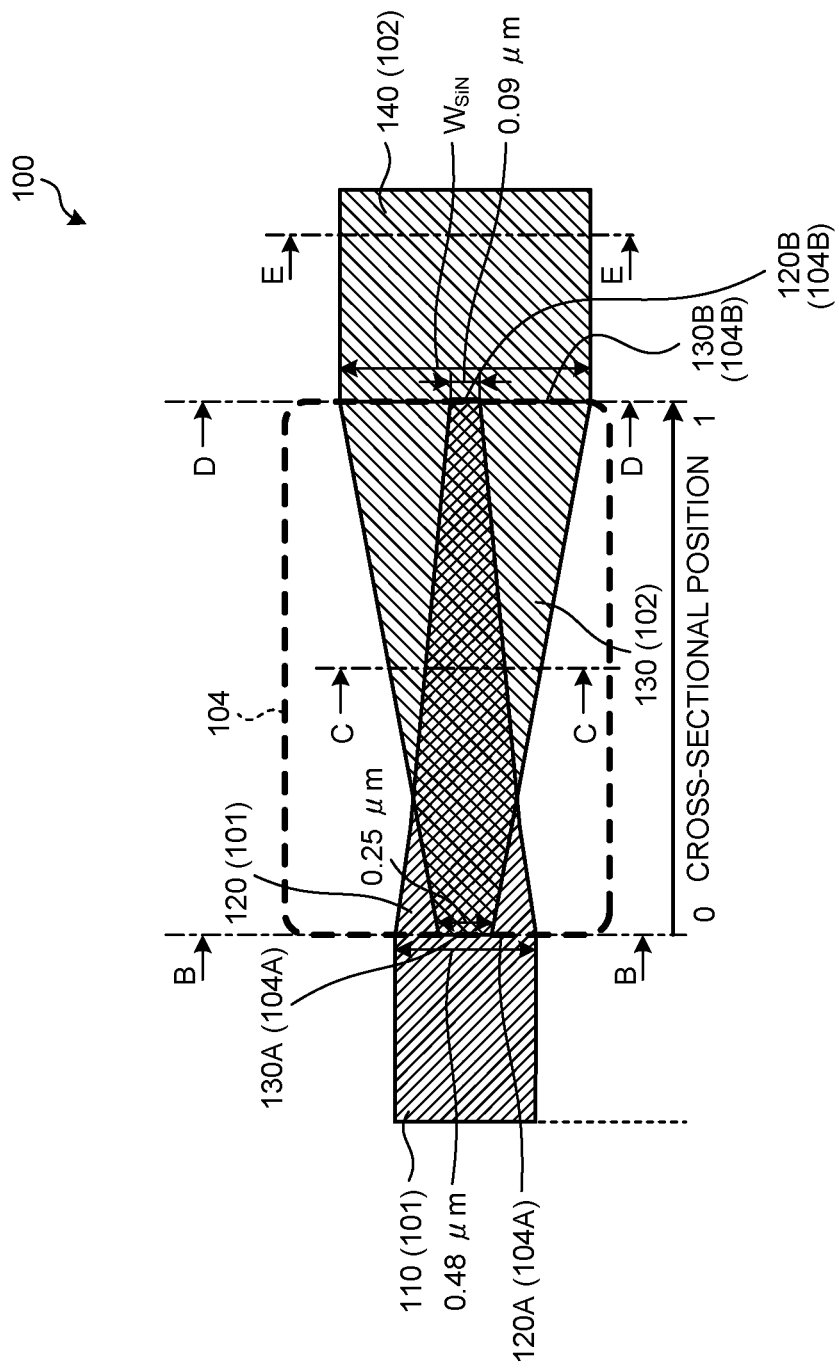
FIG. 6 is a diagram illustrating an example of a substrate type optical waveguide element according to a comparative example.

FIG. 6 is a diagram illustrating an example of a substrate type optical waveguide element 100 according to a comparative example. Furthermore, for convenience of description, in FIG. 6, a clad 103 is not illustrated. The substrate type optical waveguide element 100 illustrated in FIG. 6 includes a Si waveguide 101, a SiN waveguide 102, and the clad 103 that covers the Si waveguide 101 and the SiN waveguide 102. Furthermore, the substrate type optical waveguide element 100 includes a transition unit 104 that optically couples the Si waveguide 101 and the SiN waveguide 102 on the basis of indirect transition. The Si waveguide 101 is made of, for example, Si, and the material refractive index of Si at the time of an optical wavelength of 1.55 µm is 3.48. The SiN waveguide 102 is made of, for example, $Si_3N_4$ (hereinafter, simply referred to as SiN), and the material refractive index of SiN at the time of an optical wavelength of 1.55 µm is 1.99. The clad 103 is made of, for example, $SiO_2$, and the material refractive index of $SiO_2$ at the time of an optical wavelength of 1.55 µm is 1.44.

The Si waveguide 101 includes a first straight line waveguide 110 and a first tapered waveguide 120 that performs optical coupling with the first straight line waveguide 110. The first tapered waveguide 120 has a tapered structure in which a waveguide width is gradually reduced, in accordance with the traveling direction of light, from an output port of the first straight line waveguide 110 toward an input port of the SiN waveguide 102. The waveguide width of the first straight line waveguide 110 is defined as, for example, 0.48 µm. Furthermore, the waveguide width of an input portion 120A of the first tapered waveguide 120 is defined as, for example, 0.48 µm, and a waveguide width of an output portion 120B of the first tapered waveguide 120 is defined as, for example, 0.09 µm. The thickness of each of the cores of the first straight line waveguide 110 and the first tapered waveguide 120 is defined as, for example, 0.22 µm.

The SiN waveguide 102 includes a second tapered waveguide 130 and a second straight line waveguide 140 that performs optical coupling with the second tapered waveguide 130. The second tapered waveguide 130 has a tapered structure in which a waveguide width is gradually increased from the output port of the first straight line waveguide 110 toward an input port of the second straight line waveguide 140. The waveguide width of an input portion 130A of the second tapered waveguide 130 is defined as, for example, 0.25 µm, and the waveguide width of an output portion 130B of the second tapered waveguide 130 is defined as, for example, $W_{SiN}$. The waveguide width of the second straight line waveguide 140 is also defined as, for example, $W_{SiN}$. The thickness of the cores of each of the second straight line waveguide 140 and the second tapered waveguide 130 is defined as, for example, 0.3 µm.

The substrate type optical waveguide element 100 includes the transition unit 104 that is constituted by disposing a part of the second tapered waveguide 130 on the first tapered waveguide 120 in an overlapped manner with a space between the first tapered waveguide 120 and the second tapered waveguide 130. Furthermore, the space between the first tapered waveguide 120 and the second tapered waveguide 130 is defined as, for example, 0.3 µm.

Figure 7A:
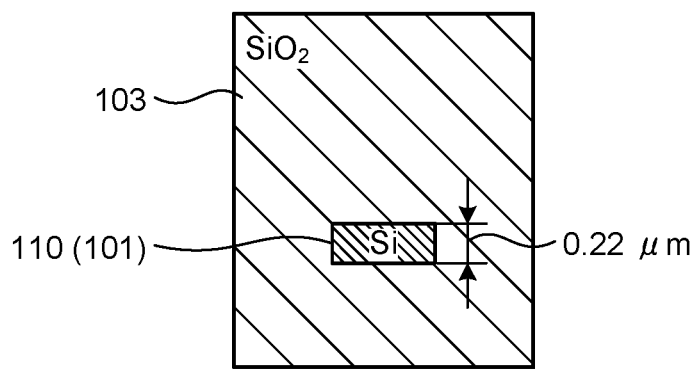
FIG. 7A is a diagram schematically illustrating an example of a cross-sectional portion taken along line A-A illustrated in FIG. 6.

The transition unit 104 includes an input portion 104A, an output portion 104B, and an intermediate portion 104C that is located between the input portion 104A and the output portion 104B. FIG. 7A is a diagram schematically illustrating an example of a cross-sectional portion taken along line A-A illustrated in FIG. 6. The cross-sectional portion schematically illustrated in FIG. 7A taken along line A-A in FIG. 6 is a schematic cross-sectional portion of the first straight line waveguide 110 included in the Si waveguide 101. Furthermore, the waveguide width of the first straight line waveguide 110 is defined as, for example, 0.48 µm, and the thickness of the core is defined as, for example, 0.22 µm.

Figure 7B:
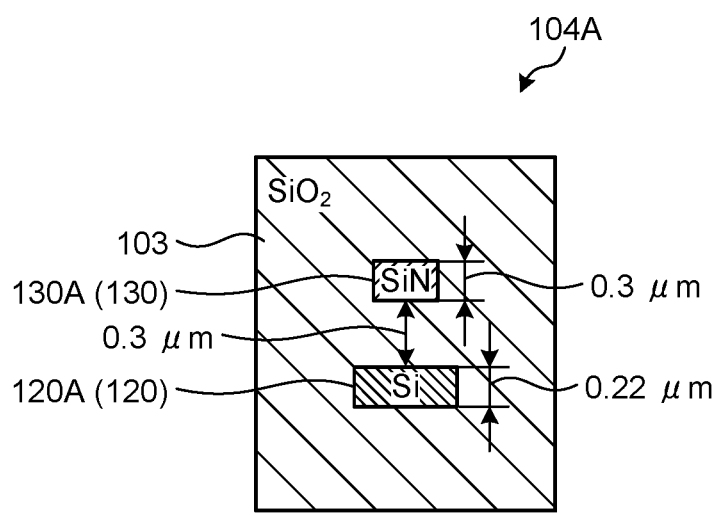
FIG. 7B is a diagram schematically illustrating an example of a cross-sectional portion taken along line B-B illustrated in FIG. 6.

FIG. 7B is a diagram schematically illustrating an example of a cross-sectional portion taken along line B-B illustrated in FIG. 6. The cross-sectional portion schematically illustrated in FIG. 7B taken along line B-B in FIG. 6 is a schematic cross-sectional portion of the input portion 104A of the transition unit 104 and has a structure in which the waveguide width of the input portion 120A of the first tapered waveguide 120 is larger than the waveguide width of the input portion 130A of the second tapered waveguide 130. The waveguide width of the input portion 120A of the first tapered waveguide 120 is defined as, for example, 0.48 µm, and the waveguide width of the input portion 130A of the second tapered waveguide 130 is defined as, for example, 0.25 µm. The thickness of the core of the first tapered waveguide 120 is defined as, for example, 0.22 µm, and the thickness of the core of the second tapered waveguide 130 is defined as, for example, 0.3 µm. The space between the first tapered waveguide 120 and the second tapered waveguide 130 is defined as, for example, 0.3 µm.

Figure 7C:
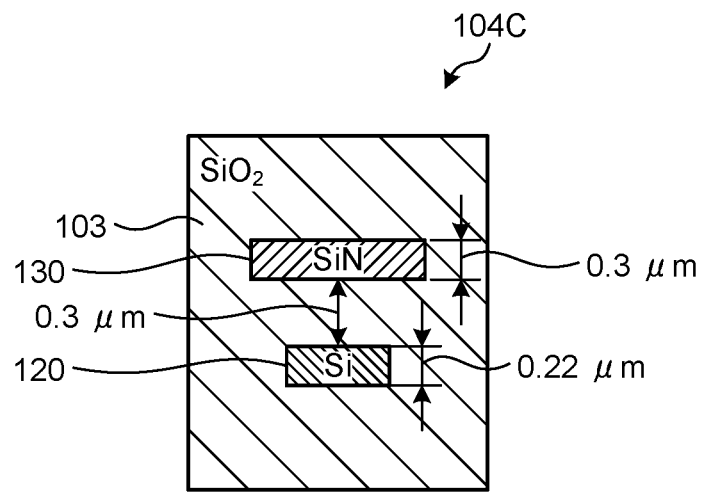
FIG. 7C is a diagram schematically illustrating an example of a cross-sectional portion taken along line C-C illustrated in FIG. 6.

FIG. 7C is a diagram schematically illustrating an example of a cross-sectional portion taken along line C-C illustrated in FIG. 6. The cross-sectional portion schematically illustrated in FIG. 7C taken along line C-C in FIG. 6 is a schematic cross-sectional portion of the intermediate portion 104C of the transition unit 104 and has a structure in which the waveguide width of the first tapered waveguide 120 is smaller than the waveguide width of the second tapered waveguide 130. The thickness of the core of the first tapered waveguide 120 is defined as, for example, 0.22 µm, and the thickness of the core of the second tapered waveguide 130 is defined as, for example, 0.3 µm. The space between the first tapered waveguide 120 and the second tapered waveguide 130 is defined as, for example, 0.3 µm.

Figure 7D:
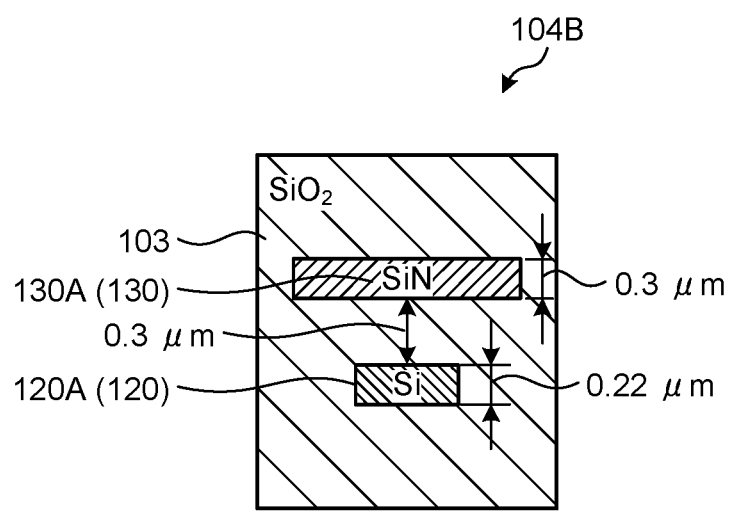
FIG. 7D is a diagram schematically illustrating an example of a cross-sectional portion taken along line D-D illustrated in FIG. 6.

FIG. 7D is a diagram schematically illustrating an example of a cross-sectional portion taken along line D-D illustrated in FIG. 6. The cross-sectional portion schematically illustrated in FIG. 7D taken along line D-D in FIG. 6 is a schematic cross-sectional portion of the output portion 104B of the transition unit 104 and has a structure in which the waveguide width of the output portion 130B of the second tapered waveguide 130 is larger than the waveguide width of the output portion 120B of the first tapered waveguide 120. The waveguide width of the output portion 120B of the first tapered waveguide 120 is defined as, for example, 0.09 µm, and the waveguide width of the output portion 130B of the second tapered waveguide 130 is defined as $W_{SiN}$. The thickness of the core of the first tapered waveguide 120 is defined as, for example, 0.22 µm, and the thickness of the core of the second tapered waveguide 130 is defined as, for example, 0.3 µm. The space between the first tapered waveguide 120 and the second tapered waveguide 130 is defined as, for example, 0.3 µm.

Figure 7E:
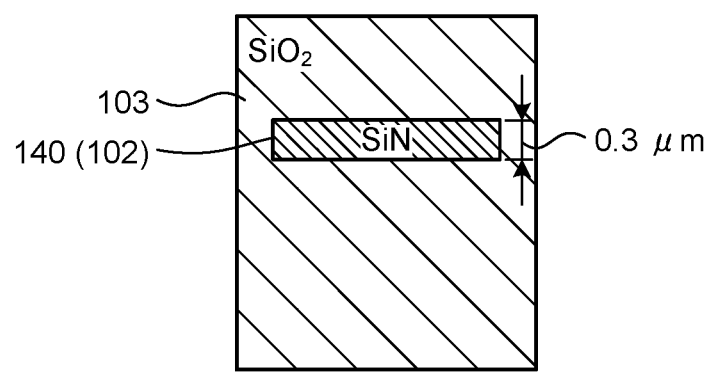
FIG. 7E is a diagram schematically illustrating an example of a cross-sectional portion taken along line E-E illustrated in FIG. 6.

FIG. 7E is a diagram schematically illustrating an example of a cross-sectional portion taken along line E-E illustrated in FIG. 6. The cross-sectional portion schematically illustrated in FIG. 7E taken along line E-E in FIG. 6 is a schematic cross-sectional portion of the second straight line waveguide 140 included in the SiN waveguide 102. Furthermore, the waveguide width of the second straight line waveguide 140 is defined as $W_{SiN}$, and the thickness of the core is defined as, for example, 0.3 μm.

The input portion 104A of the transition unit 104 includes a first cross-sectional portion having a structure in which light received from the first straight line waveguide 110 is discontinuous at a portion in which the input portion 120A of the first tapered waveguide 120 and the input portion 130A of the second tapered waveguide 130 are overlapped with each other. The waveguide width of the input portion 120A is different from the waveguide width of the input portion 130A, so that a discontinuous portion of light is consequently constituted between the first tapered waveguide 120 and the second tapered waveguide 130.

The output portion 104B of the transition unit 104 includes a second cross-sectional portion in which light output to the second straight line waveguide 140 is discontinuous at a portion in which the output portion 120B of the first tapered waveguide 120 and the output portion 130B of the second tapered waveguide 130 are overlapped with each other. The waveguide width of the output portion 120B is different from the waveguide width of the output portion 130B, so that a discontinuous portion of light is constituted between the first tapered waveguide 120 and the second tapered waveguide 130.

The input portion 104A of the transition unit 104 has a structure in which the waveguide width of the first tapered waveguide 120 is large and the waveguide width of the second tapered waveguide 130 is small, and, in contrast, the output portion 104B has a structure in which the waveguide width of the first tapered waveguide 120 is small and the waveguide width of the second tapered waveguide 130 is large. That is, the structure is constituted such that the waveguide width of the first tapered waveguide 120 is gradually decreased from the input portion 120A toward the output portion 120B, and the waveguide width of the second tapered waveguide 130 is gradually increased from the input portion 130A toward the output portion 130B. In general, confinement of light to the core is stronger as the waveguide width of the waveguide increased, so that the effective refractive index is increased affected by the material refractive index of the core.

Each of the input portion 104A and the output portion 104B of the transition unit 104 has a structure that has a large difference between the effective refractive index of the TM0 mode propagating through the first tapered waveguide 120 and the effective refractive index of the TM0 mode propagating through the second tapered waveguide 130. As a result, in the input portion 104A and the output portion 104B of the transition unit 104, it is possible to reduce the interaction in which the electric fields are distributed in both of the Si waveguide 101 and the SiN waveguide 102. For example, in the output portion 104B of the transition unit 104 corresponding to a cross-sectional portion in which the Si waveguide 101 having a small waveguide width located at the downstream of the SiN waveguide 102 is terminated, the electric fields E are localized in the core of the SiN waveguide 102, so that it is possible to suppress a loss caused by discontinuity.

Furthermore, the intermediate portion 104C of the transition unit 104 has a structure in which the effective refractive index of the TM0 mode propagating through the first tapered waveguide 120 approaches and agrees with the effective refractive index of the TM0 mode propagating through the second tapered waveguide 130 approach each other and are matched. As a result, the interaction in which the electric fields are distributed in both of the Si waveguide 101 and the SiN waveguide 102 is strengthened.

In the transition unit 104 according to the comparative example, by applying a large difference between the effective refractive index of the TM0 mode propagating through the Si waveguide 101 and the effective refractive index of the TM0 mode propagating through the SiN waveguide 102, it is possible to suppress an optical loss produced by the light scattering at a discontinuous cross-sectional portion.

Figure 8:
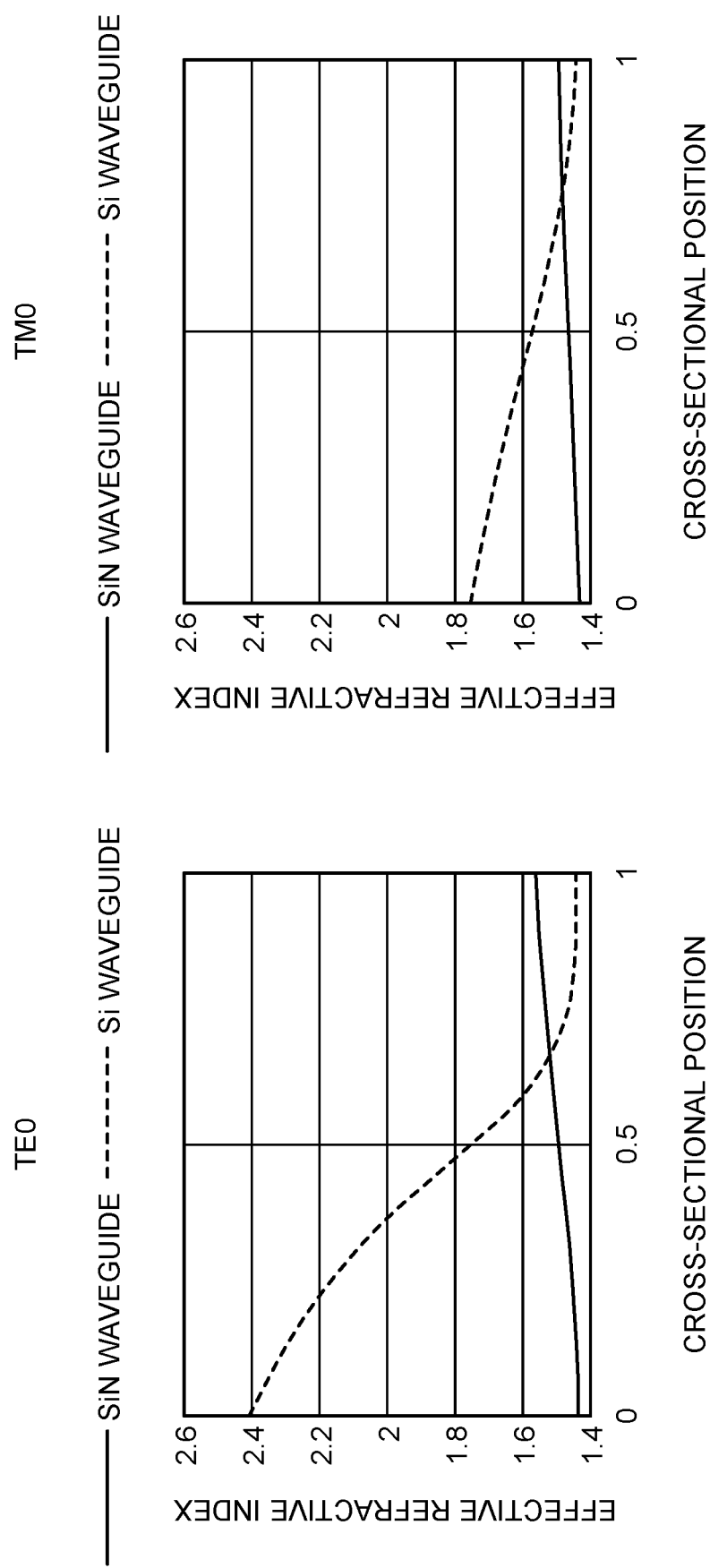
FIG. 8 is a diagram illustrating an example of a calculation result of each of the effective refractive indices of the TE0 mode and the TM0 mode propagating through each of cross-sectional positions of the transition unit.

However, it is difficult to provide a difference in the effective refractive index of the TM0 mode propagating through the different waveguides due to the following verification result. FIG. 8 is a diagram illustrating an example of calculation results of the effective refractive indices of the TE0 mode and the TM0 mode propagating through each of the cross-sectional positions of the transition unit 104.

FIG. 8 is a diagram graphically illustrating calculation results of the effective refractive indices of the TE0 mode and the TM0 mode propagating through each of the cross-sectional positions of the Si waveguide 101 and the SiN waveguide 102 included in the transition unit 104. A first cross-sectional position "0" corresponds to the input portion 104A of the transition unit 104 and is a cross-sectional portion taken along line B-B illustrated in FIG. 7B. A second cross-sectional position "1" corresponds to the output portion 104B of the transition unit 104 and is a cross-sectional portion taken along line D-D illustrated in FIG. 7D. A third cross-sectional position "0.5" corresponds to the intermediate portion 104C included in the transition unit 104 and is a cross-sectional portion taken along line C-C illustrated in FIG. 7C. The wavelength of light passing through the Si waveguide 101 and the SiN waveguide 102 is defined as 1.55 μm. The finite element method is used to calculate the effective refractive indices. It is assumed that, in the calculation, the effective refractive indices in the case where the Si waveguide 101 and the SiN waveguide 102 are isolated is calculated. Furthermore, "isolated" means that the waveguide that is different from the target waveguide is separated up to infinity.

Figure 3A:
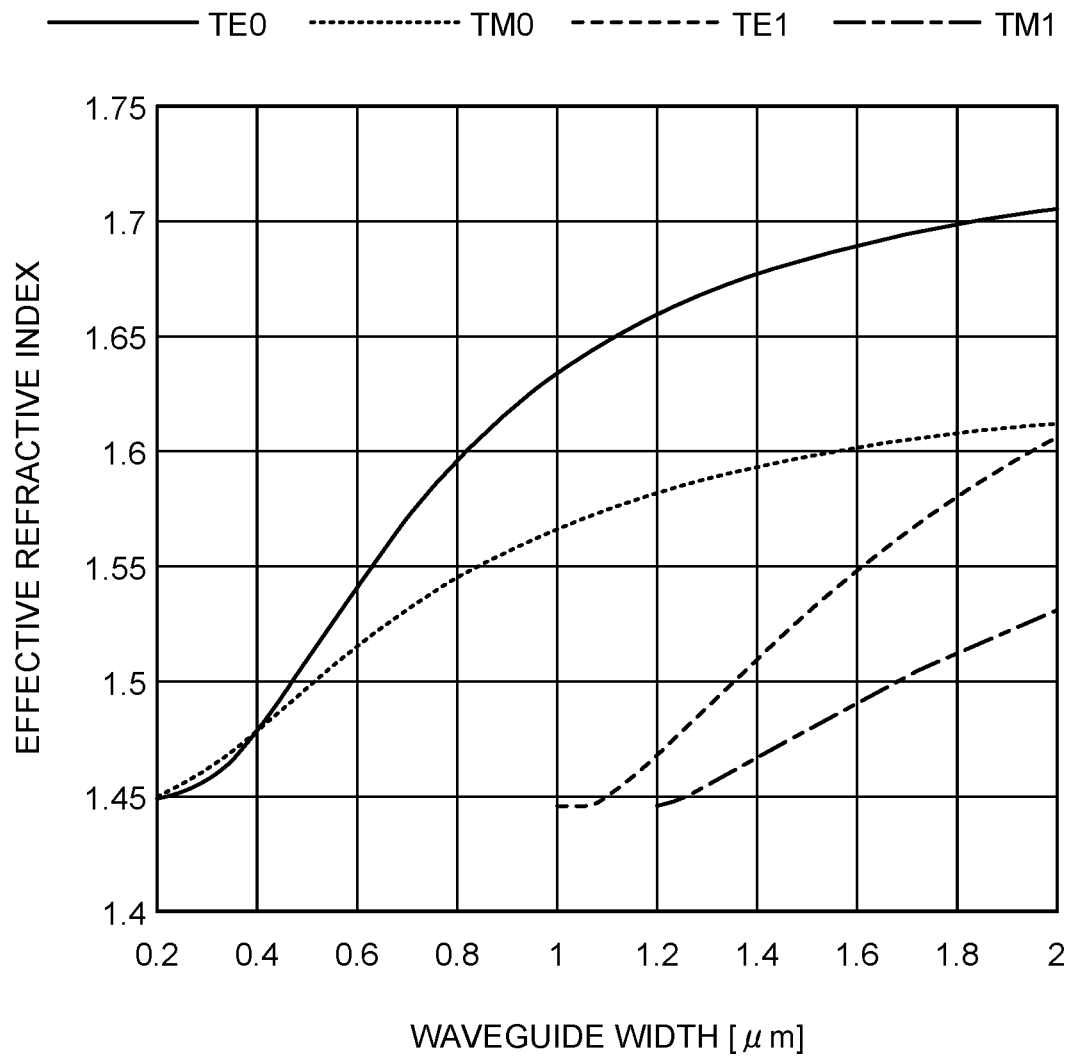
FIG. 3A is a diagram illustrating an example of a relationship among effective refractive indices in each of the modes in accordance with a waveguide width (core thickness of 0.4 μm) of a SiN waveguide in an output portion of a conventional inter-waveguide transition structure.
Figure 3B:
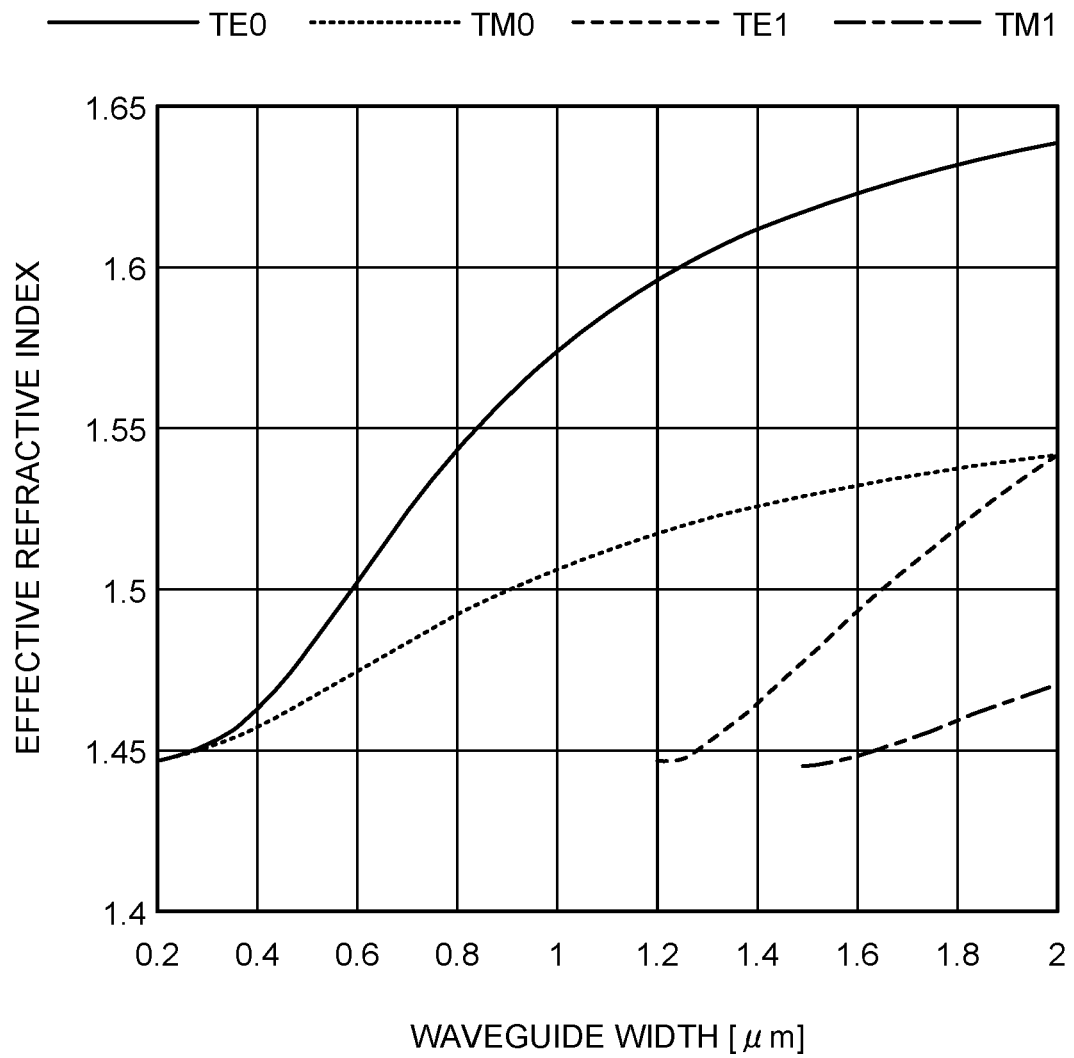
FIG. 3B is a diagram illustrating an example of a relationship among effective refractive indices in each of the modes in accordance with a waveguide width (core thickness of 0.3 μm) of the SiN waveguide in an output portion in a transition unit.

It is assumed that, at the time when the maximum waveguide width $W_{SiN}$ is 1.0 um in the SiN waveguide 102, a single mode condition is satisfied as illustrated in FIG. 3B, which will be described later. In other words, it is assumed that, in the SiN waveguide 102, a TE1 mode that is a higher-order mode out of the TE modes and a TM1 mode that is a higher-order mode out of the TM modes do not propagate.

At the second cross-sectional position "1" at which the Si waveguide 101 is terminated, as illustrated in FIG. 8, a difference between the effective refractive index of the TE0 mode propagating through the Si waveguide 101 and the effective refractive index of the TE0 mode propagating through the SiN waveguide 102 is 0.126. In contrast, a difference between the effective refractive index of the TM0 mode propagating through the Si waveguide 101 and the effective refractive index of the TM0 mode propagating through the SiN waveguide 102 is 0.056. Therefore, it is difficult for the TM0 mode to make a difference between the Si waveguide 101 and the SiN waveguide 102 with respect to the effective refractive index.

Furthermore, at the input portion 104A and the output portion 104B of the transition unit 104, in order to reduce the effect of discontinuity of the waveguide, in a case of the TM0 mode, the waveguide width needs to be increased as compared to a case of the TE0 mode. In particular, this is further noticeable in the case where a discontinuous cross-sectional portion is the Si waveguide 101 in which the refractive index is high. Accordingly, at the time at which light propagates by indirect transition when propagating through the Si waveguide 101 to the SiN waveguide 102, there is a need to increase the waveguide width of the SiN waveguide 102 located at the upstream of the discontinuous cross-sectional portion of the Si waveguide 101. However, if the waveguide width of the SiN waveguide 102 is excessively increased, the condition for the single mode waveguide is not satisfied, and the higher-order mode consequently propagates. As a result, if the higher-order mode is propagated, a higher-order mode is generated due to the effect of rough side walls that is produced inside the waveguide at the time of manufacturing, and, an unneeded interference or the like is produced due to generation of the higher-order mode, which leads to characteristic degradation of an optical signal.

Accordingly, embodiments of a substrate type optical waveguide element 1 that resolves the above described circumstances will be explained in detail below with reference to the accompanying drawings. Furthermore, the present invention is not limited to the embodiments. In addition, the embodiments described below may also be used in any appropriate combination as long as the embodiments do not conflict with each other.

Embodiment

Figure 1:
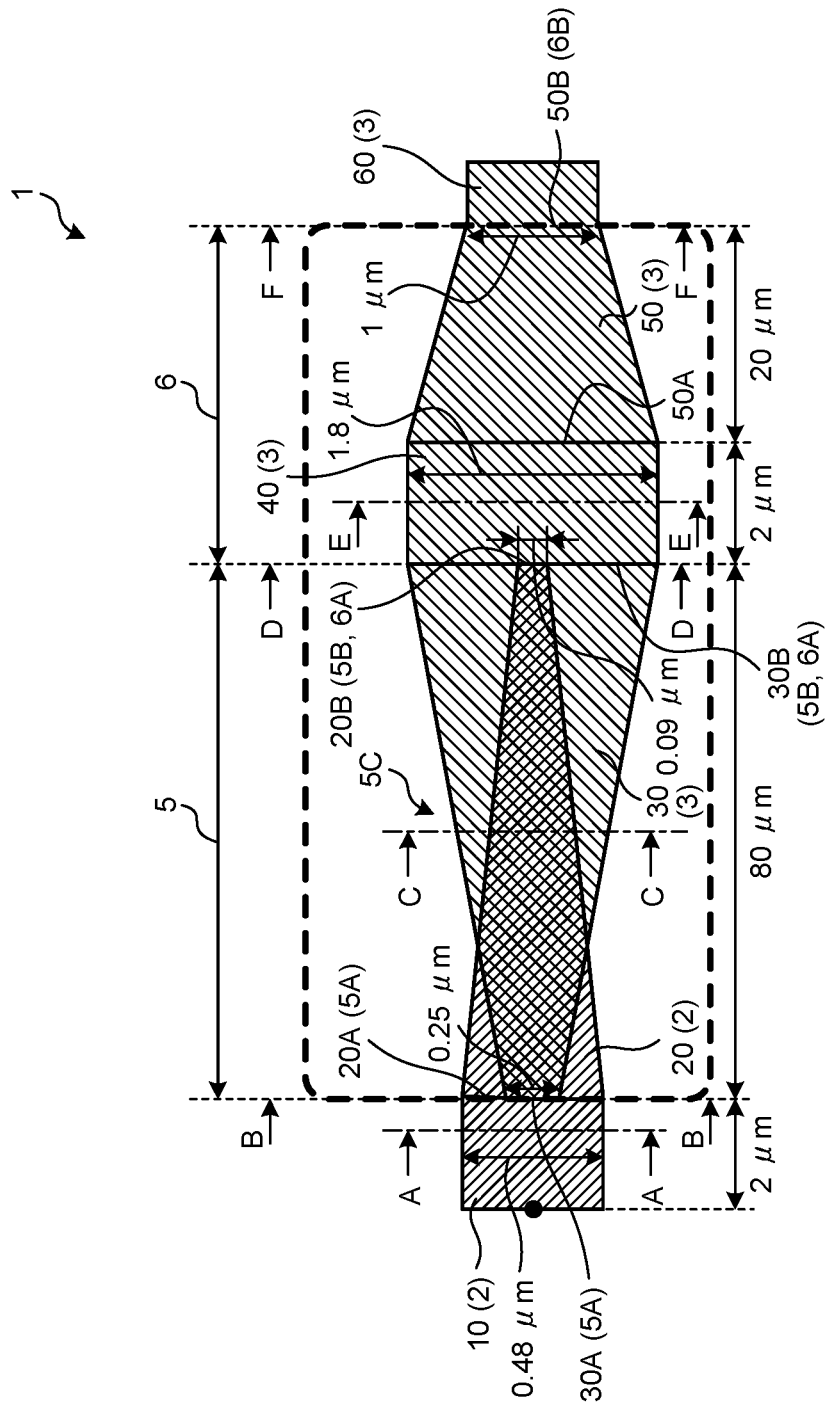
FIG. 1 is a diagram illustrating an example of a substrate type optical waveguide element according to a present embodiment.

FIG. 1 is a diagram illustrating an example of the substrate type optical waveguide element 1 according to the present embodiment. The substrate type optical waveguide element 1 illustrated in FIG. 1 includes a Silicon (Si) waveguide 2, a Silicon Nitride (SiN) waveguide 3, a clad 4 that covers the Si waveguide 2 and the SiN waveguide 3. The substrate type optical waveguide element 1 allows light to be transitioned between the Si waveguide 2 and the SiN waveguide 3 in an adiabatic indirect transition manner. The Si waveguide 2 is a first waveguide that is made of, for example, Si. The material refractive index of Si at the time of the optical wavelength of 1.55 μm is 3.48. The material refractive index of Si is a first material refractive index. The SiN waveguide 3 is a second waveguide that is made of, for example, $Si_3N_4$ (hereinafter, simply referred to as SiN). The material refractive index of SiN at the time of the optical wavelength of 1.55 μm is 1.99. The material refractive index of SiN is a second material refractive index that is smaller than the first material refractive index. The clad 4 is a layer that is made of, for example, $SiO_2$. The material refractive index of $SiO_2$ at the time of the optical wavelength of 1.55 μm is 1.44.

The Si waveguide 2 includes a first straight line waveguide 10 and a first tapered waveguide 20 that performs optical coupling with the first straight line waveguide 10. The first tapered waveguide 20 has a tapered structure in which the waveguide width is gradually reduced from an output portion of the first straight line waveguide 10 toward an input portion of a second straight line waveguide 40 included in the SiN waveguide 3. The waveguide width of the first straight line waveguide 10 is defined as, for example, 0.48 μm. Furthermore, waveguide width of an input portion 20A of the first tapered waveguide 20 is defined as, for example, 0.48 μm, and the waveguide width of an output portion 20B of the first tapered waveguide 20 is defined as, for example, 0.09 μm. The thickness of the core of each of the first straight line waveguide 10 and the first tapered waveguide 20 is defined as, for example, 0.22 μm.

The SiN waveguide 3 includes a second tapered waveguide 30, the second straight line waveguide 40 that performs optical coupling with the second tapered waveguide 30, a third tapered waveguide 50 that performs optical coupling with the second straight line waveguide 40, and a third straight line waveguide 60 that performs optical coupling with the third tapered waveguide 50. The second tapered waveguide 30 has a tapered structure in which the waveguide width is gradually increased from an output portion of the first straight line waveguide 10 toward an input portion of the second straight line waveguide 40. The waveguide width of an input portion 30A of the second tapered waveguide 30 is defined as, for example, 0.25 μm, and the waveguide width of an output portion 30B of the second tapered waveguide 30 is defined as, for example, 1.8 μm. The waveguide width of the second straight line waveguide 40 is defined as, for example, 1.8 μm.

The third tapered waveguide 50 has a tapered structure in which the waveguide width is gradually decreased from an output portion of the second straight line waveguide 40 toward an input portion of the third straight line waveguide 60. The waveguide width of an input portion 50A of the third tapered waveguide 50 is defined as, for example, 1.8 μm, and a waveguide width of an output portion 50B of the third tapered waveguide 50 is defined as, for example, 1 μm. The waveguide width of the third straight line waveguide 60 is defined as, for example, 1 μm. The thickness of the core of each of the second tapered waveguide 30, the second straight line waveguide 40, the third tapered waveguide 50, and the third straight line waveguide 60 is defined as, for example, 0.3 μm.

The substrate type optical waveguide element 1 includes a transition unit 5 and a removing unit 6. The transition unit 5 includes the first tapered waveguide 20 included in the Si waveguide 2 and the second tapered waveguide 30 included in the SiN waveguide 3. In the transition unit 5, the TM0 mode that propagates through the first tapered waveguide 20 is transitioned to the TM0 mode that propagates through the second tapered waveguide 30 by disposing a part of the second tapered waveguide 30 on the first tapered waveguide 20 in an overlapped manner with a space between the first tapered waveguide 20 the second tapered waveguide 30. At the position of an input to the transition unit 5, the second tapered waveguide 30 is used as a single mode waveguide through which light in the TM0 mode having the maximum effective refractive index out of the TM modes propagates. At the position of an output from the transition unit 5, the second tapered waveguide 30 is used as a multi-mode waveguide through which light in the TM0 mode and in a higher-order mode included in the TM modes propagate. Furthermore, the space between the first tapered waveguide 20 and the second tapered waveguide 30 is defined as, for example, 0.3 μm.

In the transition unit 5, the waveguide width of the second tapered waveguide 30 included in the SiN waveguide 3 is larger than the waveguide width of the first tapered waveguide 20 included in the Si waveguide 2, so that an area in which the light electric fields of the SiN waveguide 3 are confined is relatively larger than an area of the Si waveguide 2. As a result, it is possible to reduce the effect of light scattering caused by discontinuity at an output portion 5B that corresponds to the second cross-sectional portion in which the first tapered waveguide 20 is terminated. However, in the multi-mode waveguide, the TM0 mode and a higher-order mode included in the TM modes interfere with each other due to the effect of discontinuity or the like of random waveguide caused by rough side walls that are produced inside the waveguide at the time of manufacturing, and ripple is accordingly produced in wavelength spectral regions, so that the characteristic of the optical device is degraded. Accordingly, the structure is constituted such that the higher-order mode included in the TM modes is removed in the removing unit 6.

The removing unit 6 allows the third tapered waveguide 50 to be a single mode waveguide through which only the light in the TM0 mode propagates by removing light in the higher-order mode from the light in the TM0 modes received from the transition unit 5. The removing unit 6 includes the second straight line waveguide 40 and the third tapered waveguide 50. The second straight line waveguide 40 is a multi-mode waveguide through which the higher-order TM modes above the TM1 mode propagates. The third tapered waveguide 50 is a single mode waveguide through which only the TM0 mode propagates by removing only the light in the higher-order TM mode received from the second straight line waveguide 40. The third tapered waveguide 50 is able to avoid an interference with the higher-order mode while suppressing the optical loss in the TM0 mode by removing the higher-order TM mode from the multi modes received from the second straight line waveguide 40.

The transition unit 5 includes an input portion 5A, the output portion 5B, and an intermediate portion 5C. Furthermore, the waveguide length between the input portion 5A and the output portion 5B of the transition unit 5 is defined as, for example, 80 µm. At the input portion 5A of the transition unit 5, the second tapered waveguide 30 is set to be a single mode waveguide in which only the light in the TM0 mode having the maximum effective refractive index out of the TM modes propagates. Furthermore, at the output portion 5B of the transition unit 5, the second tapered waveguide 30 is set to be a multi-mode waveguide in which light in the TM0 mode and the light in the higher-order modes of the TM mode propagates. The removing unit 6 includes an input portion 6A and an output portion 6B. Furthermore, the waveguide length of the second straight line waveguide 40 included in the removing unit 6 is defined as, for example, 2 µm. In addition, the waveguide length of the third tapered waveguide 50 included in the removing unit 6 is defined as, for example, 20 µm.

Figure 2A:
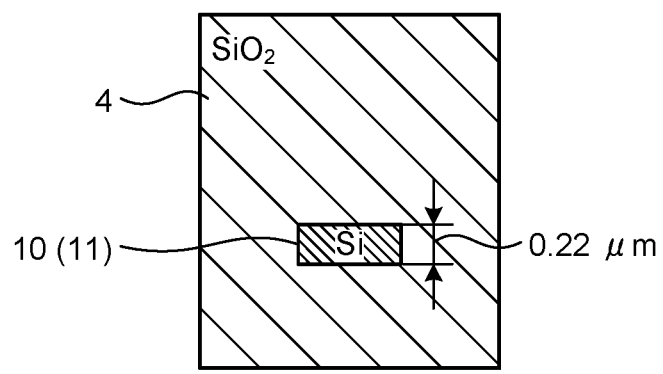
FIG. 2A is a diagram schematically illustrating an example of a cross-sectional portion taken along line A-A illustrated in FIG. 1.

FIG. 2A is a diagram schematically illustrating an example of a cross-sectional portion taken along line A-A illustrated in FIG. 1. The cross-sectional portion schematically illustrated in FIG. 2A taken along line A-A in FIG. 1 is a cross-sectional portion of the first straight line waveguide 10 included in the Si waveguide 2. Furthermore the waveguide width of the first straight line waveguide 10 is defined as, for example, 0.48 µm, and the thickness of the core is defined as, for example, 0.22 µm.

Figure 2B:
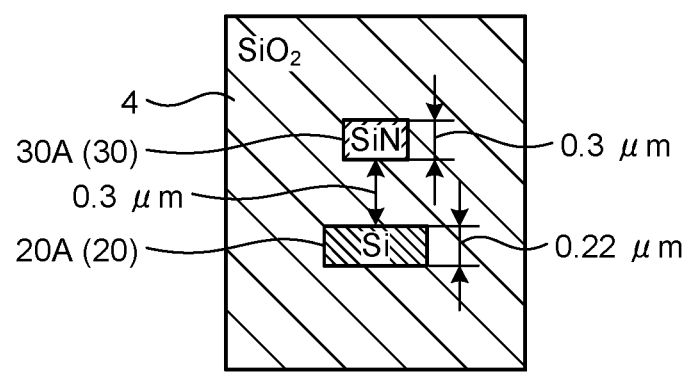
FIG. 2B is a diagram schematically illustrating an example of a cross-sectional portion taken along line B-B illustrated in FIG. 1.

FIG. 2B is a diagram schematically illustrating an example of a cross-sectional portion taken along line B-B illustrated in FIG. 1. The cross-sectional portion schematically illustrated in FIG. 2B taken along line B-B in FIG. 1 is a schematic cross-sectional portion of the input portion 5A of the transition unit 5 and has a structure in which the waveguide width of the input portion 20A of the first tapered waveguide 20 is larger than the waveguide width of the input portion 30A of the second tapered waveguide 30. The waveguide width of the input portion 20A of the first tapered waveguide 20 is defined as, for example, 0.48 µm, and the waveguide width of the input portion 30A of the second tapered waveguide 30 is defined as, for example, 0.25 µm. The thickness of the core of the first tapered waveguide 20 is defined as, for example, 0.22 µm, and the thickness of the core of the second tapered waveguide 30 is defined as, for example, 0.3 µm. The space between the first tapered waveguide 20 and the second tapered waveguide 30 is defined as, for example, 0.3 µm.

Figure 2C:
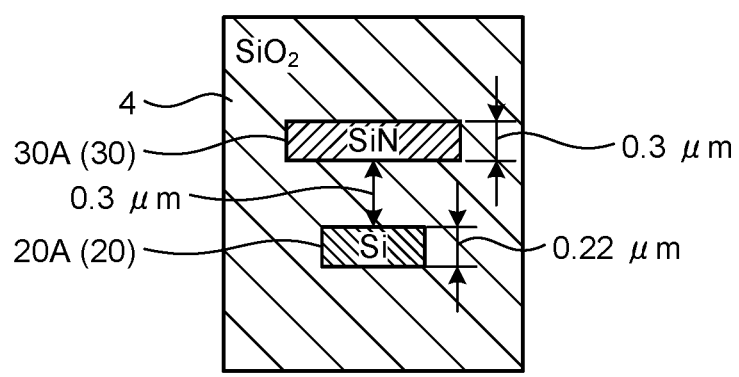
FIG. 2C is a diagram schematically illustrating an example of a cross-sectional portion taken along line C-C illustrated in FIG. 1.

FIG. 2C is a diagram schematically illustrating an example of a cross-sectional portion taken along line C-C illustrated in FIG. 1. The cross-sectional portion schematically illustrated in FIG. 2C taken along line C-C in FIG. 1 is a schematic cross-sectional portion of the intermediate portion 5C of the transition unit 5, and has a structure in which the waveguide width of the first tapered waveguide 20 is smaller than the waveguide width of the second tapered waveguide 30. The thickness of the core of the first tapered waveguide 20 is defined as, for example, 0.22 µm, and the thickness of the core of the second tapered waveguide 30 is defined as, for example, 0.3 µm. The space between the first tapered waveguide 20 and the second tapered waveguide 30 is defined as, for example, 0.3 µm.

Figure 2D:
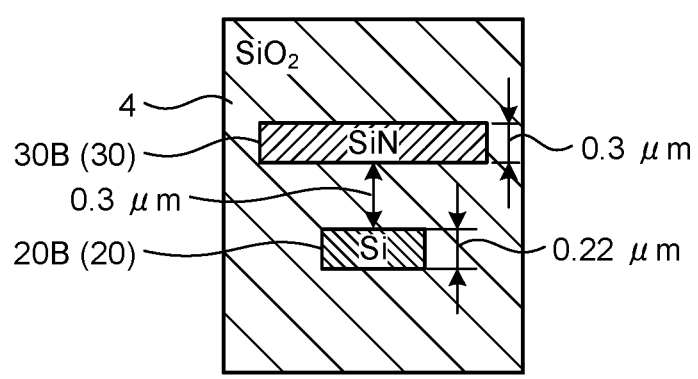
FIG. 2D is a diagram schematically illustrating an example of a cross-sectional portion taken along line D-D illustrated in FIG. 1.

FIG. 2D is a diagram schematically illustrating an example of a cross-sectional portion taken along line D-D illustrated in FIG. 1. The cross-sectional portion schematically illustrated in FIG. 2D taken along line D-D is a schematic cross-sectional portion of the output portion 5B of the transition unit 5, and has a structure in which the waveguide width of the output portion 30B of the second tapered waveguide 30 is larger than the waveguide width of the output portion 20B of the first tapered waveguide 20. The waveguide width of the output portion 20B of the first tapered waveguide 20 is defined as, for example, 0.09 µm, and the waveguide width of the output portion 130B of the second tapered waveguide 30 is defined as, for example, 1.8 µm. The thickness of the core of the first tapered waveguide 20 is defined as, for example, 0.22 µm, and the thickness of the core of the second tapered waveguide 30 is defined as, for example, 0.3 µm. The space between the first tapered waveguide 20 and the second tapered waveguide 30 is defined as, for example, 0.3 µm.

Figure 2E:
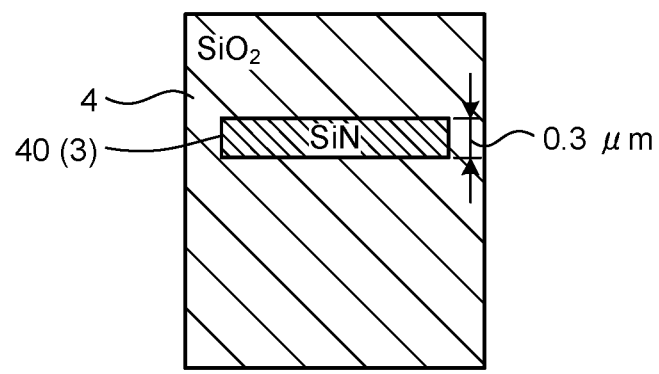
FIG. 2E is a diagram schematically illustrating an example of a cross-sectional portion taken along line E-E illustrated in FIG. 1.

FIG. 2E is a diagram schematically illustrating an example of a cross-sectional portion taken along line E-E illustrated in FIG. 1. The cross-sectional portion schematically illustrated in FIG. 2E taken along line E-E is a schematic cross-sectional portion of the second straight line waveguide 40 included in the removing unit 6. Furthermore, the waveguide width of the second straight line waveguide 40 is defined as, for example, 1.8 µm, and the thickness of the core is defined as, for example, 0.3 µm.

Figure 2F:
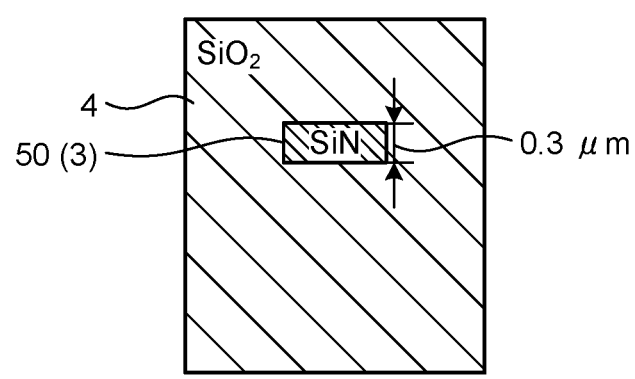
FIG. 2F is a diagram schematically illustrating an example of a cross-sectional portion taken along line F-F illustrated in FIG. 1.

FIG. 2F is a diagram schematically illustrating an example of a cross-sectional portion taken along line F-F illustrated in FIG. 1. The cross-sectional portion schematically illustrated in FIG. 2F taken along line F-F is a schematic cross-sectional portion of the third tapered waveguide 50 that corresponds to the output portion 6B of the removing unit 6, and has a structure in which the waveguide width of the output portion 50B of the third tapered waveguide 50 is smaller than the waveguide width of the second straight line waveguide 40. The waveguide width of the output portion 50B of the third tapered waveguide 50 is the same as the waveguide width of the third straight line waveguide 60. The waveguide width of the output portion 50B of the third tapered waveguide 50 is defined as, for example, 1 µm, and the waveguide width of the third straight line waveguide 60 is defined as, for example, 1 µm. The thickness of the core of each of the third tapered waveguide 50 and the third straight line waveguide 60 is defined as, for example, 0.3 µm.

The input portion 5A of the transition unit 5 includes a first cross-sectional portion in which light from the first straight line waveguide 10 becomes discontinuous at a position in which the input portion 20A of the first tapered waveguide 20 and the input portion 30A of the second tapered waveguide 30 are overlapped with each other. The waveguide width of the input portion 20A is different from the waveguide width of the input portion 30A, so that a discontinuous part of signal light is constituted between the first tapered waveguide 20 and the second tapered waveguide 30.

The output portion 5B of the transition unit 5 includes a second cross-sectional portion in which light to the second straight line waveguide 40 does not become discontinuous at a position in which the output portion 20B of the first tapered waveguide 20 and the output portion 30B of the second tapered waveguide 30 are overlapped with each other. The waveguide width of the output portion 20B is different from the waveguide width of the output portion 30B, so that a discontinuous part of light is constituted between the first tapered waveguide 20 and the second tapered waveguide 30.

At the input portion 5A of the transition unit 5, the waveguide width of the first tapered waveguide 20 is large and the waveguide width of the second tapered waveguide 30 is small, and, in contrast, at the output portion 5B, the waveguide width of the first tapered waveguide 20 is small, and the waveguide width of the second tapered waveguide 30 is large. In other words, the structure is constituted such that the waveguide width of the first tapered waveguide 20 is gradually decreased from the input portion 20A toward the output portion 20B, and the waveguide width of the second tapered waveguide 30 is gradually increased from the input portion 30A toward the output portion 30B.

The structure of each of the input portion 5A and the output portion 5B of the transition unit 5 is constituted such that a large difference is provided between the effective refractive index of the TM0 mode propagating through the first tapered waveguide 20 and the effective refractive index of the TM0 mode propagating through the second tapered waveguide 30. At the input portion 5A of the transition unit 5, the effective refractive index of the TM0 mode propagating through the first tapered waveguide 20 is higher than the effective refractive index of the TM0 mode propagating through the second tapered waveguide 30. In other words, it is possible to reduce the interaction in which the electric fields are distributed in both of the Si waveguide 2 and the SiN waveguide 3. Furthermore, at the output portion 5B of the transition unit 5, the effective refractive index of the TM0 mode propagating through the second tapered waveguide 30 is higher than the effective refractive index of the TM0 mode propagating through the first tapered waveguide 20. In other words, it is possible to reduce the interaction in which the electric fields are distributed in both of the Si waveguide 2 and the SiN waveguide 3. As a result, at the input portion 5A and the output portion 5B of the transition unit 5, it is possible to reduce the interaction in which the electric fields are distributed in both of the Si waveguide 2 and the SiN waveguide 3.

Furthermore, at the intermediate portion 5C of the transition unit 5, the structure is constituted such that the effective refractive index of the TM0 mode propagating through the first tapered waveguide 20 approaches and agrees with the effective refractive index of the TM0 mode propagating through the second tapered waveguide 30. As a result, the interaction in which the electric fields are distributed in both of the Si waveguide 2 and the SiN waveguide 3 is strengthened.

At the input portion 5A, the effective refractive index of the TM0 mode propagating through the first tapered waveguide 20 obtained in the case where the first tapered waveguide 20 is set to be an isolated waveguide is larger than the effective refractive index of the TM0 mode propagating through the second tapered waveguide 30 obtained in the case where the second tapered waveguide 30 is set to be an isolated waveguide. At the output portion 5B, the effective refractive index of the TM0 mode propagating through the second tapered waveguide 30 obtained in the case where the second tapered waveguide 30 is set to be an isolated waveguide is larger than the effective refractive index of the TM0 mode propagating through the first tapered waveguide 20 obtained in the case where the first tapered waveguide 20 is set to be an isolated waveguide. In other words, at the input portion 5A and the output portion 5B of the transition unit 5, the structure is constituted such that the magnitude relationship of the effective refractive index of the propagating TM0 modes is inverted, that is, a great difference is made between the effective refractive indices of the TM0 modes, so that it is possible to suppress an optical loss caused by light scattering at the discontinuous cross-sectional portion.

The transition unit 5 has been structured such that the waveguide width of the SiN waveguide 3 (the second tapered waveguide 30) is increased to, for example, 1.8 µm in order to suppress the effect caused by the discontinuous portion with respect to the TM0 mode as much as possible, so that it is possible to suppress the effect caused by the discontinuous portion with respect to the TM0 mode. However, the transition unit 5 has been structured such that the waveguide width of the SiN waveguide 3 (the second tapered waveguide 30) is increased, the higher-order mode included in the TM modes is consequently propagated.

Accordingly, the removing unit 6 disposed in the rear stage of the transition unit 5 removes the higher-order mode from the TM modes received from the transition unit 5 and propagates only the TM0 mode, so that it is possible to avoid an interference with the higher-order mode.

FIG. 3A is a diagram illustrating an example of the relationship between the effective refractive indices of the respective modes in accordance with the waveguide width (the thickness of the core of 0.4 µm) of the SiN waveguide 202 exhibited at the output portion 200B of the conventional inter-waveguide transition structure 200. Furthermore, it is assumed that the effective refractive index is calculated by using the finite element method.

First, in the conventional inter-waveguide transition structure 200, the thickness of the core of the SiN waveguide 202 at 1.55 µm in the C band is defined as 0.4 µm, and the waveguide width of the portion of the SiN waveguide 202 in which the Si waveguide 201 is terminated is defined as 0.9 µm. The waveguide width of the SiN waveguide 202 included in the conventional inter-waveguide transition structure 200 is 0.9 µm; therefore, when referring to FIG. 3A, it is found that the SiN waveguide 202 is a waveguide through which the TM0 mode and the TE0 mode are propagated and the higher-order modes above the TM1 mode and TE1 mode are not propagated. That is, the SiN waveguide 202 included in the conventional inter-waveguide transition structure 200 is a single mode waveguide through which, for example, the TM0 mode is propagated.

FIG. 3B is a diagram illustrating an example of the relationships among the effective refractive indices of the respective modes in accordance with the waveguide width (the thickness of the core of 0.3 µm) of the SiN waveguide 3 at the output portion 5B of the transition unit 5. Furthermore, it is assumed that the effective refractive index is calculated by using the finite element method.

First, in the transition unit 104 according to the comparative example, the thickness of the core of the SiN waveguide 102 is defined as 0.3 μm at 1.55 μm in the C band, and the waveguide width of the portion of the SiN waveguide 102 in which the Si waveguide 101 is terminated is defined as 1.0 μm. The waveguide width of the SiN waveguide 102 of the transition unit 104 according to the comparative example is 1.0 μm; therefore, when referring to FIG. 3B, it is found that the SiN waveguide 102 is a waveguide through which the TM0 mode and the TE0 mode are propagated and the higher-order modes above the TM1 mode and the TE1 mode are not propagated. That is, the SiN waveguide 102 included in the transition unit 104 according to the comparative example is a single mode waveguide through which, for example, the TM0 mode is propagated.

In contrast, in the second tapered waveguide 30 that corresponds to the output portion 5B of the transition unit 5 according to the present embodiment, the waveguide width of the second tapered waveguide 30 in which the first tapered waveguide 20 is terminated is, for example, 1.8 μm. Therefore, when referring to FIG. 3B, the output portion 5B of the transition unit 5 is a multi-mode waveguide through which the TM0 mode, the TE0 mode, and the higher-order modes above the TM1 mode and the TE1 mode are propagated. In contrast, the SiN waveguide 202 included in the conventional inter-waveguide transition structure 200 is a single mode waveguide. Therefore, the SiN waveguide 3 corresponding to the output portion 5B of the transition unit 5 according to the present embodiment is a multi-mode waveguide, so that it can be said that the conventional SiN waveguide 202 is different from the SiN waveguide 3 according to the present embodiment.

Furthermore, the waveguide width of the output portion 50B of the third tapered waveguide 50 included in the removing unit 6 according to the present embodiment is 1 μm; therefore, when referring to FIG. 3B, the third tapered waveguide 50 is a single mode waveguide that does not propagate the higher-order mode corresponding to the TM1 mode. Accordingly, the third tapered waveguide 50 removes the higher-order mode from the multi modes and propagates the TM0 mode.

Figure 4:
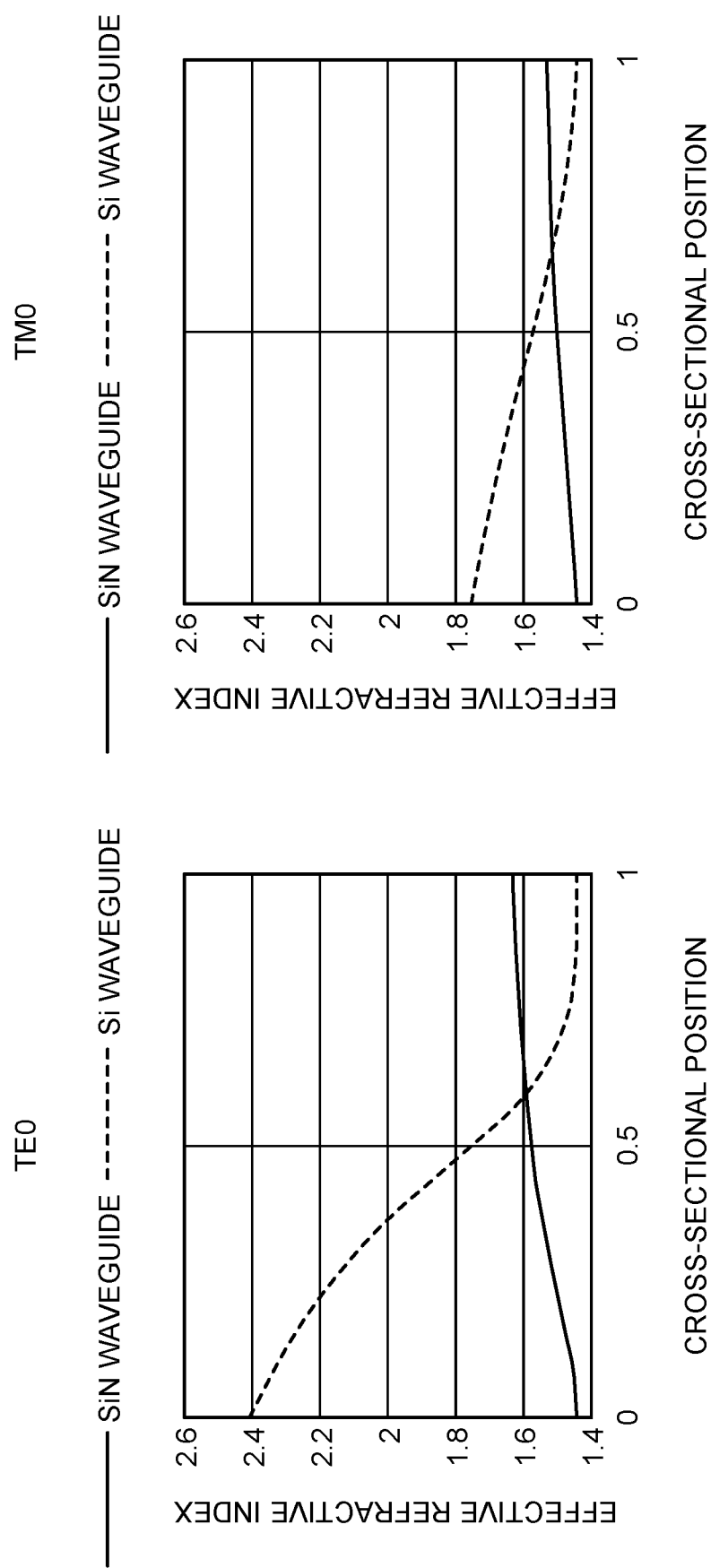
FIG. 4 is a diagram illustrating an example of a calculation result of each of the effective refractive indices of the TE0 mode and the TM0 mode propagating through each of cross-sectional positions in the transition unit.

FIG. 4 is a diagram illustrating an example of the calculation results of the effective refractive indices of the TE0 mode and the TM0 mode that propagate at each of the cross-sectional positions of the transition unit 5. The first cross-sectional position "0" corresponds to the cross-sectional portion of the input portion 5A of the transition unit 5 and is a cross-sectional portion taken along line B-B illustrated in FIG. 2B. The second cross-sectional position "1" corresponds to the cross-sectional portion of the output portion 5B of the transition unit 5 and is a cross-sectional portion taken along line D-D illustrated in FIG. 2D. The third cross-sectional position "0.5" corresponds to the cross-sectional portion of the intermediate portion 5C of the transition unit 5 and is a cross-sectional portion taken along line C-C illustrated in FIG. 2C. The wavelength of light propagating through the Si waveguide 2 and the SiN waveguide 3 is defined as 1.55 μm. The finite element method is used to calculate the effective refractive index. Furthermore, at the time of calculation, the effective refractive index in the case where each of the waveguides is isolated is calculated.

At the output portion 5B in which the Si waveguide 2 of the transition unit 5 is terminated and that corresponds to the second cross-sectional position "1", when referring to FIG. 4, a difference between the effective refractive index of the TM0 mode propagating through the Si waveguide 2 and the effective refractive index of the TM0 mode propagating through the SiN waveguide 3 is 0.087. Furthermore, as illustrated in FIG. 8, a difference between the effective refractive indices of the output portion 104B of the transition unit 104 according to the comparative example is 0.056. That is, the difference between the effective refractive indices at the output portion 5B of the transition unit 5 according to the present embodiment is larger than the difference between the effective refractive indices at the output portion 104B of the transition unit 104 according to the comparative example. As a result, in the transition unit 5, by increasing the difference between the effective refractive indices, it is possible to reliably suppress an optical loss caused by light scattering at the discontinuous cross-sectional portion.

Furthermore, electric field component of the TM0 mode in the vertical direction at the output portion 104B of the transition unit 104 according to the comparative example is compared to the electric field component of the TM0 mode in the vertical direction at the output portion 5B of the transition unit 5 according to the present embodiment. The electric field component in the vertical direction is calculated by using the finite element method. Furthermore, the core thickness of the SiN waveguide 102 included in the transition unit 104 according to the comparative example is defined as 0.3 μm, and the waveguide width of the SiN waveguide 102 at the output portion 104B is defined as 1.0 μm. The core thickness of the SiN waveguide 3 included in the transition unit 5 according to the present embodiment is defined as 0.3 μm, and the waveguide width of the SiN waveguide 3 at the output portion 5B is defined as 1.8 μm.

The proportion of the power localized in the Si waveguide 101 at the output portion 104B of the transition unit 104 according to the comparative example is 1.0%, whereas the proportion of the power localized in the Si waveguide 2 at the output portion 5B of the transition unit 5 according to the present embodiment is 0.7%. That is, at the output portion 5B of the transition unit 5 according to the present embodiment, a larger amount of optical power is localized in the SiN waveguide 3 as compared to that at the output portion 5B of the transition unit 104 according to the comparative example. As a result, at the output portion 5B of the transition unit 5, even if the Si waveguide 2 is not discontinuously present, most power is localized in the SiN waveguide 3, so that it is possible to connect to the second straight line waveguide 40 at a low loss.

Furthermore, a transition loss obtained in the case where the TM0 mode is input to each of the substrate type optical waveguide element 100 according to the comparative example and the substrate type optical waveguide element 1 according to the present embodiment is calculated by using the finite-difference time-domain method. The transition loss is able to be calculated on the basis of −10 log 10 (output power as TM0/input power of TM0). The transition loss in the substrate type optical waveguide element 100 according to the comparative example is 0.051 dB, whereas the transition loss in the substrate type optical waveguide element 1 according to the present embodiment is 0.013 dB. Furthermore, a transition loss in the transition unit 5 included in the substrate type optical waveguide element 1 is 0.012 dB, and a transition loss in the removing unit 6 is 0.001 dB.

As a result, the transition unit 5 is a multi-mode waveguide, so that the transition loss is greatly improved. For example, in an optical circuit in an optical communication apparatus that has the substrate type optical waveguide element 1 (100) built in, a case in which a plurality of pieces of the substrate type optical waveguide elements 1 (100), for example, 10 pieces of the substrate type optical waveguide elements 1 (100) are built in is conceived. A transition loss in a communication device having the substrate type optical waveguide elements 100 according to the comparative example built in is 0.51 dB. In contrast, a transition loss in a communication device having the substrate type optical waveguide elements 1 according to the present embodiment built in is 0.13 dB. As a result, with the communication device having the substrate type optical waveguide elements 1 according to the present embodiment built in, it is possible to reduce the transition loss by an amount equal to 0.38 dB as compared to a case of the communication device having the substrate type optical waveguide elements 100 according to the comparative example built in.

Furthermore, in the substrate type optical waveguide element 1 (100), the Si waveguide 2 (101) is formed by performing lithography and etching Si that is uniformly formed on the surface of a wafer. Then, for example, the SiN waveguide 3 (102) is formed on the Si waveguide 2 (101) by performing lithography using a mask when the SiN waveguide 3 (102) is formed on the Si waveguide 2 (101) with a space between the Si waveguide 2 (101) and the SiN waveguide 3. However, there may be a case in which a positional relationship between the Si waveguide 2 (101) and the SiN waveguide 3 (102) is shifted caused by a mask shift.

If the mask shift has occurred between the Si waveguide 2 (101) and the SiN waveguide 3 (102), the distribution of the electric fields at the output portion 104B of the transition unit 104 included in the substrate type optical waveguide element 100 according to the comparative example varies, so that the transition loss is increased. In contrast, at the output portion 5B of the transition unit 5 included in the substrate type optical waveguide element 1 according to the present embodiment, the waveguide width (1.8 μm) of the SiN waveguide 3 is larger than that according to the comparative example, so that it is possible to concentrate the electric fields in the SiN waveguide 3 by reducing the effect of the shift caused by the mask shift.

In order to verify this effect, it is assumed a case in which the SiN waveguide 3 shifts, with respect to the Si waveguide 2, in the direction perpendicular to the traveling direction of light by 0.12 μm due to the occurrence of the mask shift. Then, a transition loss produced in the case where the TM0 mode is input to the input portion 5A of the transition unit 5 is calculated by using the finite-difference time-domain method. The transition loss is able to be calculated on the basis of −10 log 10 (output power as TM0/input power of TM0).

The transition loss in the transition unit 104 included in the substrate type optical waveguide element 100 according to the comparative example is 0.106 dB, whereas the transition loss in the substrate type optical waveguide element 1 according to the present embodiment is 0.015 dB. The transition loss in the transition unit 5 included in the substrate type optical waveguide element 1 is 0.014 dB, and the transition loss in the removing unit 6 is 0.001 dB. As a result, the SiN waveguide 3 included in the transition unit 5 according to the present embodiment is a multi-mode waveguide having a wide waveguide width, so that it is possible to greatly improve the transition loss as compared to the comparative example even if a mask shift occurs.

Furthermore, in the case where the mask shift has occurred, asymmetry is generated in the waveguide. At this time, a polarization surface is inclined, so that polarization conversion between the TE0 mode and the TM0 mode occurs in the discontinuous portion. If polarization conversion occurs at the time when a transmission amount is increased by adding different signals to the TE0 mode and the TM0 mode, a crosstalk occurs between polarizations, and thus, the quality of a signal is degraded (an increase in bit error). Furthermore, if a waveguide transition is carried out in two portions, wavelength ripple occurs at the time when returning pre-conversion polarization after the polarization conversion has been performed once due to an interference with the electric field that is not subjected to polarization conversion.

However, with the substrate type optical waveguide element 1 according to the present embodiment, at the output portion 5B, which is a discontinuous portion, of the transition unit 5, it is possible to localize the electric fields in the SiN waveguide 3, so that it is possible to reduce the effect caused by a displacement of the relative position with the Si waveguide 2. In order to verify this effect, it is assumed a case in which the SiN waveguide 3 shifts, with respect to the Si waveguide 2, in the direction perpendicular to the traveling direction of light by 0.12 μm due to the occurrence of the mask shift. Then, a transmittance to the TE0 mode obtained in the case where the TM0 mode is input to the transition unit 5 is calculated by using the finite-difference time-domain method. The transmittance is able to be calculated on the basis of 10 log 10 (output power as TE0/input power of TM0).

The transmittance of the transition unit 104 that is the substrate type optical waveguide element 100 according to the comparative example is −18.93 dB, whereas the transmittance of the substrate type optical waveguide element 1 according to the present embodiment is −39.47 dB. As a result, the substrate type optical waveguide element 1 according to the present embodiment is able to greatly suppress the effect of polarization conversion as compared to the comparative example.

Furthermore, in the present embodiment, it is possible to localize the electric fields in the SiN waveguide 3 in the discontinuous portion, so that it is also possible to reduce the reflection occurring in the discontinuous Si portion.

With the transition unit 5 according to the present embodiment, a case has been described as an example in which a difference of an effective refractive index is ensured by changing the waveguide width, but a change in the effective refractive index at the time when the waveguide width is changed is smaller in the TM0 mode than that in the TE0 mode due to the effect of a boundary condition of the electric fields. In the TE0 mode, electric fields are discontinuously retained on a side wall of the waveguide corresponding to a boundary between the Si waveguide 2 and the clad 4 and a boundary between the SiN waveguide 3 and the clad 4, so that, if the waveguide width is changed, the effect of a discontinuous electric field distribution is strongly exerted. In contrast, in the TM0 mode, although a discontinuous electric field distribution is present in the thickness direction of the waveguide, a continuous electric field distribution is present in the width direction of the waveguide, so that the effect of the discontinuous electric field distribution is small in the width direction. Therefore, it is difficult to ensure a difference of the effective refractive index by changing the waveguide width for TM0 as compared to a case of TE0. Accordingly, in the present embodiment, in order to ensure a sufficient effective refractive index even with TM0, waveguide width is increased to a level functioning as a multi-mode waveguide related to TM. Furthermore, as a result of the effect of the removing unit 6, it is possible to avoid the effect exerted on the TM0 mode occurring in the multi-mode waveguide.

Furthermore, in the substrate type optical waveguide element 1 according to the present embodiment, in general, the Si waveguide 2 and the SiN waveguide 3 are formed by performing lithography and etching on a film of the core material that is uniformly formed on the surface of the wafer. Therefore, the process is performed by only adjusting the width of the waveguide, so that it is possible to simplify the process of forming the waveguide.

An example of the second waveguide that is the transition destination of the transition unit 5 and the first waveguide that is the transition source may include a planar lightwave circuit (PLC) in which both of a core and the clad 4 are made of $SiO_2$, an InP waveguide, and a GaAs waveguide. The core may be Si or $Si_3N_4$, a lower part clad may be $SiO_2$, and an upper part clad may be $SiO_2$, air or the like. Furthermore, this may be applicable when the material refractive index of the waveguide provided at the transition destination is higher than the material refractive index of the waveguide provided at the transition source. For example, in a case of the PLC, it is also applicable by changing the material refractive index at the transition source and the transition destination by changing an amount of doping into a glass waveguide.

In the case of the PLC, it is possible to change the material refractive index by changing an amount of doping into the core. In the case of the SiN waveguide 3 and the Si waveguide 2, a difference in relative refractive index is large, so that light is strongly confined, and, as a result, it is possible to implement a bent waveguide having a low loss even if a radius R is small, and it is thus possible to reduce the size of the substrate type optical waveguide element 1.

The structure of each of the Si waveguide 2 and the SiN waveguide 3 may be a rib waveguide, a ridge waveguide, a channel waveguide, and appropriate modifications are possible. If a structure of each of the Si waveguide 2 and the SiN waveguide 3 is a rib waveguide, light is also leaked to a slab portion, the effect of the rough side walls of the core is small, and it is possible to suppress an optical loss. If a structure of each of the Si waveguide 2 and the SiN waveguide 3 is a channel waveguide, confinement of light is strong, so that it is possible to sharply bend the waveguide, and it is thus possible to reduce the size of the substrate type optical waveguide element 1. The clad 4 may be made of an arbitrary material as long as the material refractive index is smaller than that of the core, and appropriate modifications are possible.

A case has been described as an example in which the substrate type optical waveguide element 1 according to the present embodiment is a silicon optical waveguide constituted from the Si waveguide 2 made of Si as the material and the clad 4 made of $SiO_2$ as the material. However, it is also applicable to a PLC, an InP waveguide, and a GaAs waveguide in which the material of each of the Si waveguide 2 and the clad 4 is $SiO_2$.

Figure 5:
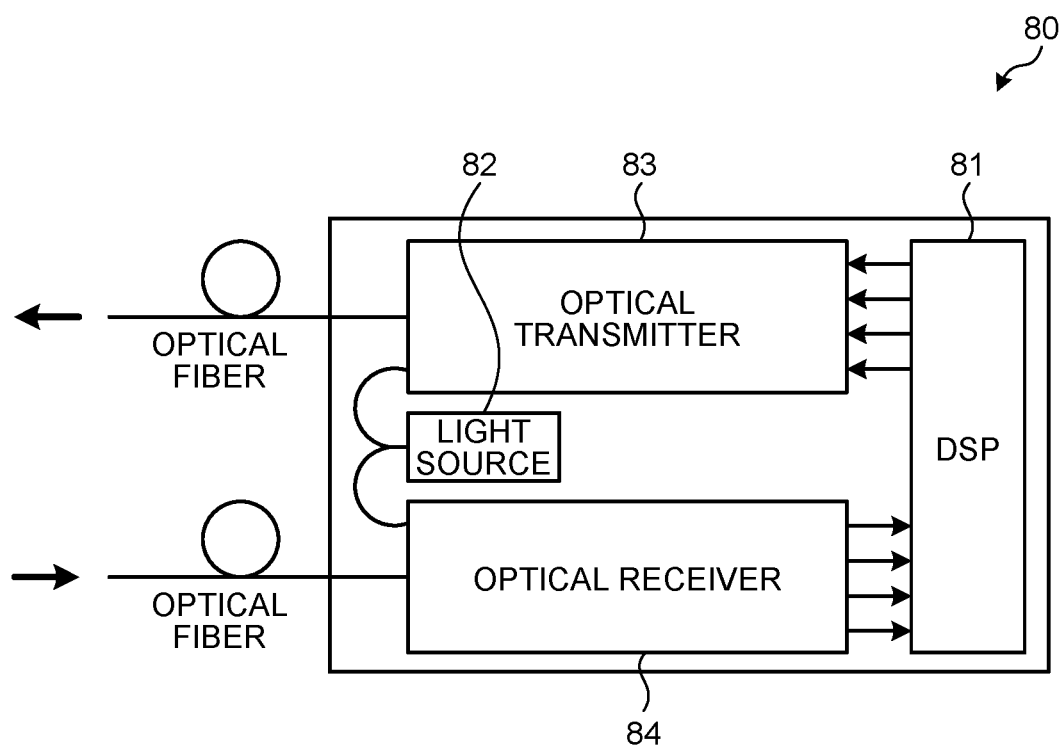
FIG. 5 is a diagram illustrating an example of an optical communication apparatus that has the substrate type optical waveguide element built in according to the present embodiment.

FIG. 5 is a diagram illustrating an example of an optical communication apparatus 80 having the substrate type optical waveguide element 1 according to the present embodiment built in. The optical communication apparatus 80 illustrated in FIG. 5 is connected to an optical fiber disposed on an output side and an optical fiber disposed on an input side. The optical communication apparatus 80 includes a digital signal processor (DSP) 81, a light source 82, an optical transmitter 83, and an optical receiver 84. The DSP 81 is an electrical component that performs digital signal processing. The DSP 81 performs a process of, for example, encoding transmission data or the like, generating an electrical signal including transmission data, and outputs the generated electrical signal to the optical transmitter 83. Furthermore, the DSP 81 acquires an electrical signal including reception data from the optical receiver 84 and obtains reception data by performing a process of, for example, decoding the acquired electrical signal.

The light source 82 includes, for example, a laser diode or the like, generates light with a predetermined wavelength, and supplies the generated light to the optical transmitter 83 and the optical receiver 84. The optical transmitter 83 is an optical device that modulates, by using the electrical signal output from the DSP 81, the light supplied from the light source 82 and that outputs the obtained transmission light to the optical fiber. The optical transmitter 83 generates the transmission light by modulating, when the light supplied from the light source 82 propagates through the waveguide, the light by using the electrical signal that is input to the optical modulator.

The optical receiver 84 receives the optical signal from the optical fiber and demodulates the received light by using the light that is supplied from the light source 82. Then, the optical receiver 84 converts the demodulated received light to an electrical signal and outputs the converted electrical signal to the DSP 81. In each of the optical transmitter 83 and the optical receiver 84, the substrate type optical waveguide element 1 functioning as a waveguide through which light is propagated built in.

In the transition unit 5 included in the substrate type optical waveguide element 1 in the optical communication apparatus 80, the structure is constituted such that the waveguide width of the SiN waveguide 3 (the second tapered waveguide 30) is increased to, for example, 1.8 μm, so that it is possible to suppress the effect caused by the discontinuous portion with respect to the TM0 mode.

Furthermore, in the removing unit 6 included in the substrate type optical waveguide element 1 included in the optical communication apparatus 80, a higher-order mode is removed from the TM mode received from the transition unit 5 and only the TM0 mode is propagated, so that it is possible to avoid an interference with the higher-order mode.

Furthermore, for convenience of description, a case has been described as an example in which the removing unit 6 according to the present embodiment includes the second straight line waveguide 40 and the third tapered waveguide 50. However, the removing unit 6 may include only the third tapered waveguide 50, and, in this case, optical coupling may be performed on the second tapered waveguide 30 and the third tapered waveguide 50 included in the output portion 5B in the transition unit 5, and appropriate modifications are possible.

According to an aspect of an embodiment, it is possible to provide an optical device and the like capable of suppressing an optical loss caused by indirect transition between different waveguides.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An optical device through which light in TM modes propagates by indirect transition between a first waveguide that is disposed on a first layer and has a first material refractive index and a second waveguide that is disposed on a second layer different from the first layer and has a second material refractive index that is lower than the first material refractive index, the second waveguide including a second tapered waveguide in which optical coupling is performed with the first waveguide based on the indirect transition and a waveguide width is gradually increased in accordance with a traveling direction of the light, the second waveguide including a straight-line waveguide in which optical coupling is performed with the second tapered waveguide, and a third tapered waveguide that includes an output end and an input end in which optical coupling is performed with the straight-line waveguide of the second waveguide and a waveguide width is gradually reduced from the input end to the output end in accordance with the traveling direction of the light, the output end having the waveguide width that is a single mode waveguide through which TM0 light propagates, and the third tapered waveguides including a straight-line waveguide in which optical coupling is performed with the third tapered waveguide, the optical device comprising:
a transition unit that includes an input portion having the second tapered waveguide that is a single mode waveguide through which TM0 light having a maximum effective refractive index propagates, and that includes an output portion having the second tapered waveguide that is a multi-mode waveguide through which the TM0 light and light in a higher order TM mode propagate, an input portion of the first waveguide and an input portion of the second tapered waveguide overlapping with a first space between the input portions and an output portion of the first waveguide and an output portion of the second tapered waveguide overlapping with a second space between the output portions such that a magnitude relationship between the maximum effective refractive index of the TM modes propagating through the first waveguide and the maximum effective refractive index of the TM modes propagating through the second tapered waveguide is inverted at the input portions and the output portions; and
a removing unit that includes the third tapered waveguide that is the single mode waveguide through which the TMO light propagates by removing the light in the higher order TM mode from the light in the TM modes received from the second tapered waveguide through the third tapered waveguide and propagating the TMO light from the second tapered waveguide through the third tapered waveguide.

2. The optical device according to claim 1, wherein the light in TM modes and in TE modes orthogonal to the TM modes propagates through the optical device by indirect transition between the first waveguide and the second waveguide.

3. The optical device according to claim 1, wherein
the first waveguide includes a first tapered waveguide in which a waveguide width is gradually reduced in accordance with a traveling direction of the light,
the second waveguide includes
the second tapered waveguide in which optical coupling is performed with the first tapered waveguide based on the indirect transition and the waveguide width is gradually increased in accordance with the traveling direction of the light.

4. The optical device according to claim 3, wherein, in the transition unit, the magnitude relationship between the maximum effective refractive index of the TM modes propagating through the first tapered waveguide in a case where the first tapered waveguide is an isolated waveguide and the maximum effective refractive index of the TM modes propagating through the second tapered waveguide in a case where the second tapered waveguide is an isolated waveguide is inverted at the input portions and the output portions.

5. The optical device according to claim 3, wherein
the transition unit
has a structure in which the waveguide width of the second tapered waveguide located at the output portion of the transition unit is larger than the waveguide width of the first tapered waveguide located at the input portion of the transition unit.

6. The optical device according to claim 1, wherein
the first waveguide covered by a clad on a substrate is made of a material including Silicon (Si),
the second waveguide covered by the clad on the substrate is made of a material including Silicon Nitride (SiN), and
the clad is made of a material including $SiO_2$.

7. The optical device according to claim 1, wherein the first waveguide and the second waveguide are rib waveguides.

8. A substrate type optical waveguide element through which light in TM modes propagates by indirect transition between a first waveguide that is disposed on a first layer and has a first material refractive index and a second waveguide that is disposed on a second layer different from the first layer and has a second material refractive index that is lower than the first material refractive index, the second waveguide including a second tapered waveguide in which optical coupling is performed with the first waveguide based on the indirect transition and a waveguide width is gradually increased in accordance with a traveling direction of the light, the second waveguide including a straight-line waveguide in which optical coupling is performed with the second tapered waveguide, and a third tapered waveguide that includes an output end and an input end in which optical coupling is performed with the straight-line waveguide of the second waveguide and a waveguide width is gradually reduced from the input end to the output end in accordance with the traveling direction of the light, the output end having the waveguide width that is a single mode waveguide through which TM0 light propagates, and the third tapered waveguide including a straight-line waveguide in which optical coupling is performed with the third tapered waveguide, the substrate type optical waveguide element comprising:
a transition unit that includes an input portion having the second tapered waveguide that is a single mode waveguide through which TM0 light having a maximum effective refractive index propagates, and that includes an output portion having the second tapered waveguide that is a multi-mode waveguide through which the TM0 light and light in a higher order TM mode propagate, an input portion of the first waveguide and an input portion of the second tapered waveguide overlapping with a first space between the input portions and an output portion of the first waveguide and an output portion of the second tapered waveguide overlapping with a second space between the output portions such that a magnitude relationship between the maximum effective refractive index of the TM modes propagating through the first waveguide and the maximum effective refractive index of the TM modes propagating through the second tapered waveguide is inverted at the input portions and the output portions; and a removing unit that includes the third tapered waveguide that is the single mode waveguide through which the TMO light propagates by removing the light in the higher order TM mode from the light in the TM modes received from the second tapered waveguide through the third tapered waveguide and propagating the TMO light from the second tapered waveguide through the third tapered waveguide.

9. An optical communication apparatus comprising:

a light source;

an optical transmitter that performs optical modulation on light received from the light source by using a transmission signal and that transmits transmission light;

an optical receiver that receives a reception signal from reception light by using the light received from the light source; and a substrate type optical waveguide element functioning as a waveguide that is used to propagate the light through the optical transmitter and the optical receiver, wherein the substrate type optical waveguide element through which light in TM modes propagates by indirect transition between a first waveguide that is disposed on a first layer and has a first material refractive index and a second waveguide that is disposed on a second layer different from the first layer and has a second material refractive index that is lower than the first material refractive index, the second waveguide including a second tapered waveguide in which optical coupling is performed with the first waveguide based on the indirect transition and a waveguide width is gradually increased in accordance with a traveling direction of the light, the second waveguide including a straight-line waveguide in which optical coupling is performed with the second tapered waveguide, and a third tapered waveguide that includes an output end and an input end in which optical coupling is performed with the straight-line waveguide of the second waveguide and a waveguide width is gradually reduced from the input end to the output end in accordance with the traveling direction of the light, the output end having the waveguide width that is a single mode waveguide through which TMO light propagates, and the third tapered waveguide including a straight-line waveguide in which optical coupling is performed with the third tapered waveguide, includes:

a transition unit that includes an input portion having the second tapered waveguide that is as a single mode waveguide through which TMO light, having a maximum effective refractive index propagates, and that includes an output portion having the second tapered waveguide that is a multi-mode waveguide through which the TMO light and light in a higher order TM mode propagate, an input portion of the first waveguide and an input portion of the second tapered waveguide overlapping with a first space between the input portions and an output portion of the first waveguide and an output portion of the second tapered waveguide overlapping with a second space between the output portions such that a magnitude relationship between the maximum effective refractive index of the TM modes propagating through the first waveguide and the maximum effective refractive index of the TM modes propagating through the second waveguide is inverted at positions of the input portion portions and the output portion portions, and a removing unit that includes the third tapered waveguide that is the single mode waveguide through which the TMO light propagates by removing the light in the higher order TM mode from the light in the TM modes received from the second tapered waveguide through the third tapered waveguide and propagating the TMO light from the second tapered waveguide through the third tapered waveguide.

10. An inter-waveguide transition method for allowing light in TM modes to propagate by indirect transition between a first waveguide that is disposed on a first layer and has a first material refractive index and a second waveguide that is disposed on a second layer different from the first layer and has a second material refractive index that is lower than the first material refractive index, the second waveguide including a second tapered waveguide in which optical coupling is performed with the first waveguide based on the indirect transition and a waveguide width is gradually increased in accordance with a traveling direction of the light, the second waveguide including a straight-line waveguide in which optical coupling is performed with the second tapered waveguide, and a third tapered waveguide that includes an output end and an input end in which optical coupling is performed with the straight-line waveguide of the second waveguide and a waveguide width is gradually reduced from the input end to the output end in accordance with the traveling direction of the light, the output end having the waveguide width that is a single mode waveguide through which TMO light propagates, and the third tapered waveguide including a straight-line waveguide in which optical coupling is performed with the third tapered waveguide, the inter-waveguide transition method for performing a process comprising:

overlapping an input portion of the first waveguide and an input portion of the second tapered waveguide with a first space between the input portions and overlapping an output portion of the first waveguide and an output portion of the second tapered waveguide with a second space between the output portions, the input portion of the second tapered waveguide being a single mode waveguide through which TMO light having a maximum effective refractive index propagates, the output portion of the second tapered waveguide being a multi-mode waveguide through which the TMO light and light in a higher order TM mode propagate, such that a magnitude relationship between the maximum effective refractive index of the TM modes propagating through the first waveguide and the maximum effective refractive index of the TM modes propagating through the second tapered waveguide is inverted at the input portions and the output portions;

removing the light in the higher order TM mode from the light in the TM modes received from the second tapered waveguide through the third tapered waveguide that is the single mode waveguide through which the TMO light propagates; and propagating the TMO light from the second tapered waveguide through the third tapered waveguide.

* * * * *